(12) United States Patent
Marks

(10) Patent No.: US 10,136,714 B2
(45) Date of Patent: Nov. 27, 2018

(54) TABLET CASE AND METHOD OF MANUFACTURE

(71) Applicant: Spinbrook Limited, Dublin (IE)

(72) Inventor: Victor L. Marks, Vancouver (CA)

(73) Assignee: Spinbrook Limited, Dublin (IE)

( * ) Notice: Subject to any disclaimer, the term of this patent is extended or adjusted under 35 U.S.C. 154(b) by 0 days.

(21) Appl. No.: 15/579,891

(22) PCT Filed: Jun. 3, 2016

(86) PCT No.: PCT/CA2016/050640
§ 371 (c)(1),
(2) Date: Dec. 5, 2017

(87) PCT Pub. No.: WO2016/191887
PCT Pub. Date: Dec. 8, 2016

(65) Prior Publication Data
US 2018/0168303 A1 Jun. 21, 2018

(30) Foreign Application Priority Data
Jun. 5, 2015 (GB) .................................. 1509751.2

(51) Int. Cl.
*H04M 1/00* (2006.01)
*A45C 11/00* (2006.01)
*G06F 1/16* (2006.01)

(52) U.S. Cl.
CPC ............ *A45C 11/00* (2013.01); *G06F 1/1626* (2013.01); *A45C 2011/003* (2013.01); *A45C 2200/15* (2013.01)

(58) Field of Classification Search
CPC .................................................. G06F 1/1626
USPC ........................................................ 455/575.8
See application file for complete search history.

(56) References Cited

U.S. PATENT DOCUMENTS

| | | |
|---|---|---|
| 7,281,698 B2 | 10/2007 | Patterson, Jr. |
| 8,132,670 B1 | 3/2012 | Chen |
| 8,230,992 B2 | 7/2012 | Law et al. |
| 8,253,518 B2 | 8/2012 | Lauder et al. |

(Continued)

FOREIGN PATENT DOCUMENTS

| | | |
|---|---|---|
| EP | 2298424 | 3/2011 |
| GB | 2508566 | 6/2014 |
| KR | 101379165 | 3/2014 |

OTHER PUBLICATIONS

WIPO, International Search Report for International Application No. PCT/CA2016/050640, dated Aug. 31, 2016, 3 pages.

(Continued)

*Primary Examiner* — April G Gonzales
(74) *Attorney, Agent, or Firm* — Inskeep IP Group, Inc.

(57) ABSTRACT

A protective case for a portable electronic device includes a hinged cover comprising a set of boards connected by a flexible cover sheet, and a receptacle which is rotatably and detachably connected to the cover by an intermediate connector forming an adjustable joint. The intermediate connector is releasably coupled to a fixed coupling element which is contained within the thickness of one of the boards of the cover, so that the assembled cover can be manufactured by pressing in a conventional press or casemaker. The receptacle includes a flexible latch and a recess whereby the user can insert a fingertip to lift the device from the receptacle.

18 Claims, 18 Drawing Sheets

(56) References Cited

U.S. PATENT DOCUMENTS

| | | | |
|---|---|---|---|
| 8,312,991 B2 | 11/2012 | Diebel et al. | |
| 8,328,008 B2 | 12/2012 | Diebel et al. | |
| 8,434,601 B2 | 5/2013 | Hou et al. | |
| 8,607,976 B2* | 12/2013 | Wu | G06F 1/1626 206/320 |
| 8,746,446 B2 | 1/2014 | Chiang | |
| 8,746,449 B2* | 6/2014 | Gallagher | F16M 11/105 206/320 |
| 8,794,436 B2 | 8/2014 | Hsu | |
| 8,807,333 B1 | 8/2014 | Cooper et al. | |
| 8,875,879 B2 | 11/2014 | Diebel et al. | |
| 8,887,903 B2 | 11/2014 | Diebel et al. | |
| 8,960,421 B1 | 2/2015 | Diebel | |
| 9,027,747 B2* | 5/2015 | Hsu | G06F 1/1626 206/45.2 |
| 9,468,118 B1* | 10/2016 | Peters | B32B 15/046 |
| 2005/0181745 A1* | 8/2005 | Wood | H04B 1/3888 455/90.3 |
| 2008/0237432 A1* | 10/2008 | Patterson | A45C 11/00 248/458 |
| 2008/0302687 A1* | 12/2008 | Sirichai | A45F 5/02 206/320 |
| 2010/0110629 A1 | 5/2010 | Dietz et al. | |
| 2010/0270188 A1 | 10/2010 | Dotson | |
| 2011/0297566 A1* | 12/2011 | Gallagher | F16M 11/105 206/320 |
| 2012/0012483 A1* | 1/2012 | Fan | F16M 11/105 206/320 |
| 2012/0018324 A1 | 1/2012 | Hale | |
| 2012/0103855 A1* | 5/2012 | Gaddis, II | G06F 1/1628 206/521 |
| 2012/0205277 A1* | 8/2012 | Chang | A45C 11/00 206/472 |
| 2012/0224323 A1* | 9/2012 | Yang | F16M 11/041 361/679.55 |
| 2012/0300394 A1 | 11/2012 | Norfolk | |
| 2012/0325702 A1* | 12/2012 | Gallagher | F16M 11/105 206/320 |
| 2013/0134061 A1* | 5/2013 | Wu | G06F 1/1626 206/320 |
| 2013/0140203 A1* | 6/2013 | Chiang | G06F 1/1628 206/320 |
| 2013/0178161 A1* | 7/2013 | Shulenberger | G06F 1/162 455/41.2 |
| 2013/0186682 A1* | 7/2013 | Gallagher | F16M 11/105 174/560 |
| 2013/0277271 A1* | 10/2013 | Toulotte | A45C 11/00 206/752 |
| 2014/0036438 A1* | 2/2014 | Gioscia | G06F 1/1628 361/679.55 |
| 2014/0066142 A1* | 3/2014 | Gipson | H04B 1/3888 455/575.8 |
| 2014/0071605 A1* | 3/2014 | Bates | G06F 1/1662 361/679.09 |
| 2014/0151248 A1* | 6/2014 | Hurst | A45C 13/1069 206/45.23 |
| 2014/0183314 A1* | 7/2014 | Mulhern | F16M 13/022 248/288.11 |
| 2014/0197048 A1* | 7/2014 | Napolitano | H05K 5/0226 206/45.2 |
| 2014/0216954 A1* | 8/2014 | Law | A45F 5/02 206/45.23 |
| 2014/0246340 A1* | 9/2014 | Jiang | A45C 11/00 206/45.23 |
| 2014/0267050 A1* | 9/2014 | Spollen | G06F 3/0219 345/168 |
| 2015/0001105 A1* | 1/2015 | Nyholm | A45C 11/00 206/45.2 |
| 2015/0041622 A1* | 2/2015 | Mulhern | F16M 11/041 248/688 |
| 2015/0052854 A1* | 2/2015 | Diebel | G06F 1/1626 53/473 |
| 2015/0069099 A1* | 3/2015 | Diebel | G06F 1/1626 224/196 |
| 2015/0083615 A1* | 3/2015 | Lay | G06F 1/1616 206/45.24 |
| 2015/0194997 A1* | 7/2015 | Johnson | H04B 1/3888 455/575.8 |

OTHER PUBLICATIONS

WIPO, Written Opinion of the International Searching Authority for International Application No. PCT/CA2016/050640, dated Aug. 31, 2016, 3 pages.

English Translation of KR101379165, retrieved Aug. 29, 2016, 3 pages.

English Abstract of EP2298424, retrieved Mar. 5, 2018, 1 page.

\* cited by examiner

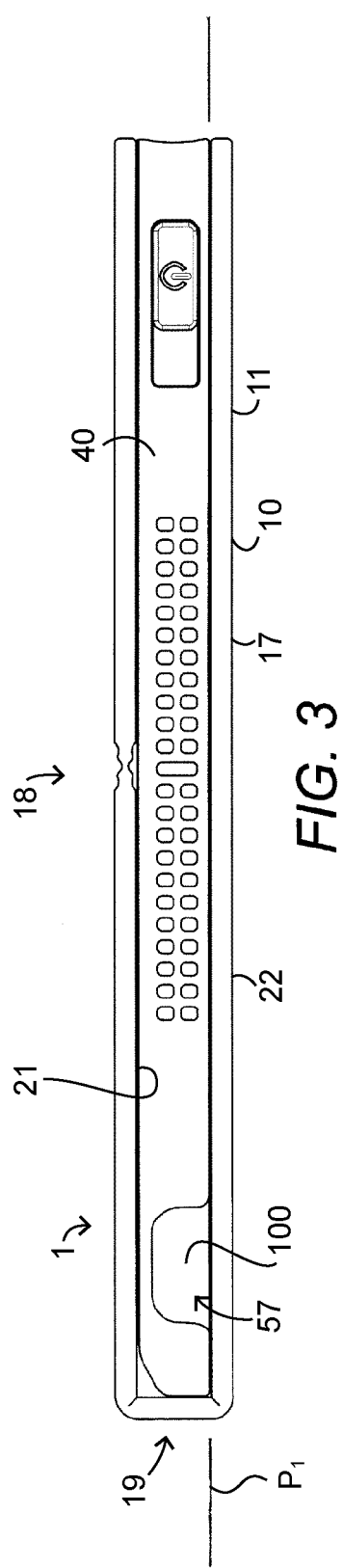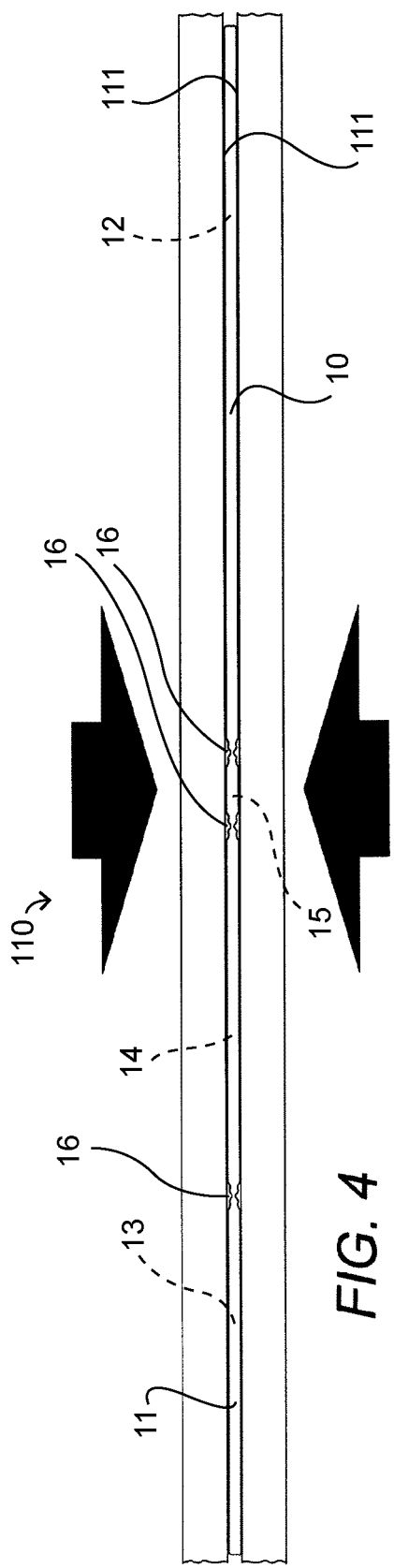

TABLET CASE AND METHOD OF MANUFACTURE

FIELD OF THE INVENTION

The present invention relates to protective cases for portable electronic devices, particularly for tablets.

BACKGROUND OF THE INVENTION

In this specification, a tablet is a portable electronic device with two oppositely arranged major front and rear surfaces, a minor thickness dimension extending between the front and rear surfaces, and a screen which occupies at least most of the front surface. Typically the front and rear surfaces are substantially flat and rectangular, and the screen occupies nearly all of the front surface. Tablets typically perform the functions of a personal computing device and/or a personal communications device and/or a personal gaming device and/or a personal display device for displaying, for example, the pages of an electronic book, photographs, movies streamed over the internet, or other images. They often incorporate cameras and other functionality which can be integrated as hardware or software, e.g. by downloading and installing an app. In many such devices the screen is a touch screen. It will be understood that mobile telephones, electronic books, personal organisers and other classes of personal electronic devices may all be considered as tablets insofar as they exhibit the form factor of a tablet.

Because of their versatility and convenience, tablets have become indispensable and are carried everywhere as personal accessories. However, their generally flat and thin form factor, which is the practical consequence of minimising the size of the tablet relative to the size of the screen, gives rise to some practical difficulties for the user.

One problem is that the tablet is quite easy to drop and quite likely to break if dropped. It is therefore common to mount the tablet in a case which provides some mechanical protection for the tablet when not in use.

Another problem is that it can be difficult to view the screen when the tablet is placed on a flat surface, and tiring for the user to hold the tablet in a better viewing position. For this reason many tablet cases are arranged also to support the tablet in a viewing position.

Many tablets are designed to display images in either a landscape or a portrait orientation, which is to say, with the length dimension of the screen respectively in a horizontal or vertical attitude. To facilitate this functionality some tablet cases are arranged to support the tablet on a horizontal surface at a convenient viewing angle in either orientation.

Since the optimal viewing angle (i.e. the angle of the screen relative to a horizontal support plane) will vary depending on the relative position of the user, some tablet cases are also arranged to support the tablet at an adjustable viewing angle.

For example, WO2014089367 discloses a tablet case which provides infinite angular adjustment of the viewing angle by hingedly adjusting respective parts of the case which are retained in the selected position by cooperating magnetic elements and frictionally enhanced surfaces. The case includes a magnetic fastener which magnetically engages a corresponding rear surface of the tablet or of a back cover attached to the tablet. The back cover can alternatively be attached to a wall mount or other accessory.

US2012224323, US2008237432, US2012012483, and US2014197048 disclose folding tablet cases in which the tablet can be angularly and rotationally adjusted to a selected display position.

WO2013158058 discloses a detachable rotating mechanism for a tablet case.

EP2298424 discloses a tablet case with interchangeable trays for receiving different video game consoles.

GB2508566 and US2012300394 disclose tablet cases in which the tablet is retained in a receptacle by a lip.

It is also known from www.dodocase.com™ to manufacture a tablet case (a "Dodocase™") comprising a tray made from bamboo for retaining the tablet and a folding cover made by traditional bookbinding techniques from boards covered by cloth or leather, wherein the receptacle is retained by magnets at a selected, infinitely adjustable viewing angle relative to the cover.

More generally, it is known to provide cases for laptops or other electronic equipment with ventilation channels as taught for example by US2010270188 and US2010110629.

The versatility of tablets means that they are used by people of all ages and backgrounds. Some users will prefer the more traditional appearance of a tablet case such as the "Dodocase™" which when closed resembles a book and completely encloses the tablet. Others will prefer the functionality of tablet cases which are configured to include interchangeable mounting systems and rotatable joints.

A common problem with all of these tablet cases is that, although such tablet cases are now so commonly used that they may be regarded as ubiquitous personal accessories, the structure and mode of manufacture of the tablet case make it difficult or expensive to adapt its appearance to suit the different tastes of different users, which is an important consideration in marketing such products.

SUMMARY OF THE INVENTION

It is an object of one aspect of the present invention to provide a tablet case which is versatile in use and cost effective and adaptable in manufacture. In another aspect, the invention sets out to provide a method of manufacturing such a tablet case. In a further aspect, the invention sets out to provide a tablet case which makes it easier to remove the tablet.

According to the various aspects of the invention there are provided a protective case for a portable electronic device and a method of manufacture, as defined in the claims.

By providing the case with a receptacle connected to the cover via an adjustable joint comprising a first coupling element which is fixedly contained substantially within the thickness of one of the boards forming the cover, the invention makes it possible to manufacture the cover using conventional automatic or semi-automatic press tools, optionally an automatic or semi-automatic casemaking machine (casemaker) which is capable of bonding the boards to the flexible cover sheet at a rate suitable for cost effective mass production, and then to connect the receptacle to the first coupling element after the finished cover is removed from the machine.

The flexible cover sheet can be provided with any desired pattern and may be arranged to form substantially the whole outer surface of the folding cover so that by merely providing a variety of alternative cover sheets the novel tablet case may be manufactured economically in a very wide range of different styles to appeal to the wide range of potential users.

Advantageously, the adjustable joint defined by the connection between the receptacle and the first coupling element can provide for detachment of the receptacle from the cover or rotation of the receptacle about a rotation axis between a landscape orientation and a portrait orientation, and most preferably provides both of these functions. The receptacle can then be re-attached to a different cover or to a separate mounting element so that the user can change the cover to change the appearance of the case, or can use the same cover with a different receptacle to receive a different tablet, or can remove the receptacle from the cover to mount the tablet temporarily on another surface, e.g. in a car or a kitchen. The novel tablet case may be configured to resemble the cover of a book so as to completely enclose the tablet for protection in transit while being versatile in use.

BRIEF DESCRIPTION OF THE DRAWINGS

Further features and advantages will be apparent from the following illustrative embodiment which will now be described, purely by way of example and without limitation to the scope of the claims, and with reference to the accompanying drawings, in which:

FIG. 3 is an end view of the case containing the tablet in the closed position;

FIG. 4 illustrates how the parts of the cover are pressed during manufacture;

Figure 1:
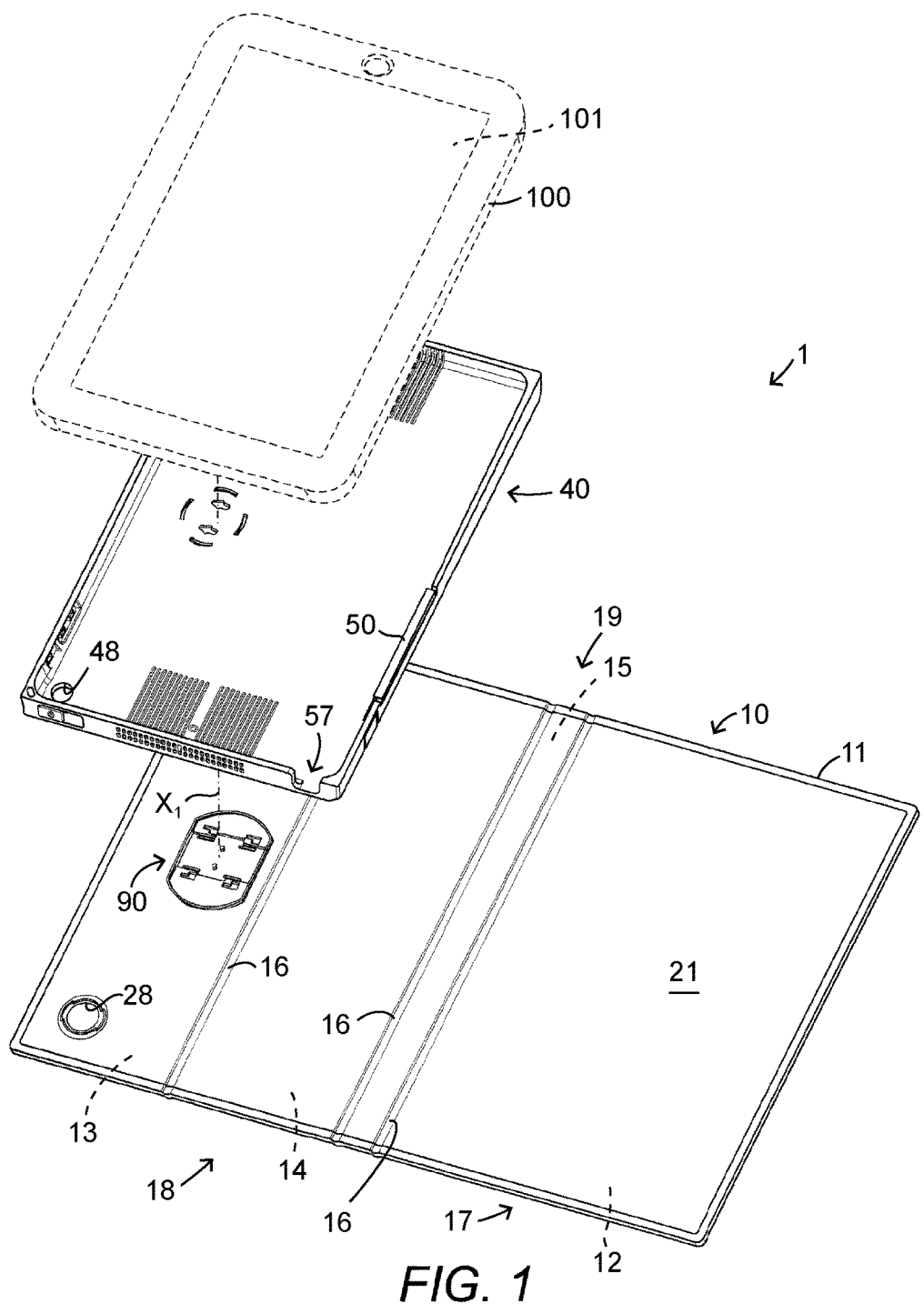
FIG. 1 shows a protective case for a tablet, comprising a cover and a receptacle.

Reference numerals which appear in more than one of the figures indicate the same or corresponding features in each of them.

DESCRIPTION OF SPECIFIC EMBODIMENTS

Referring to the drawings and first to FIG. 1, there is shown a protective case 1 for a portable electronic device, particularly a tablet 100. The case 1 comprises a cover 10 and a receptacle 40.

The cover 10 comprises a flexible outer sheet 11 bonded to four rigid, flat, plastics boards 12, 13, 14, 15 which are arranged in parallel, spaced relation on the outer sheet 11 to define narrow hinge regions 16 between them, dividing the cover into a front portion 17 comprising the first board 12 and a rear portion 18 comprising the second board 13 and the third board 14. The front and rear portions 17, 18 of the cover 10 are connected together by a spine portion 19 including the fourth board or spine board 15, which extends between two parallel hinge regions 16 between the first board 12 and the third board 14. A flexible inner sheet 20, shown in FIG. 2, is bonded to each of the boards 12, 13, 14, 15 to define an inner surface 21 of the cover 10, shown in FIG. 1, so that the outer and inner sheets 11, 20 together cover the whole of the respective front and rear surfaces of the boards as shown.

Figure 2:
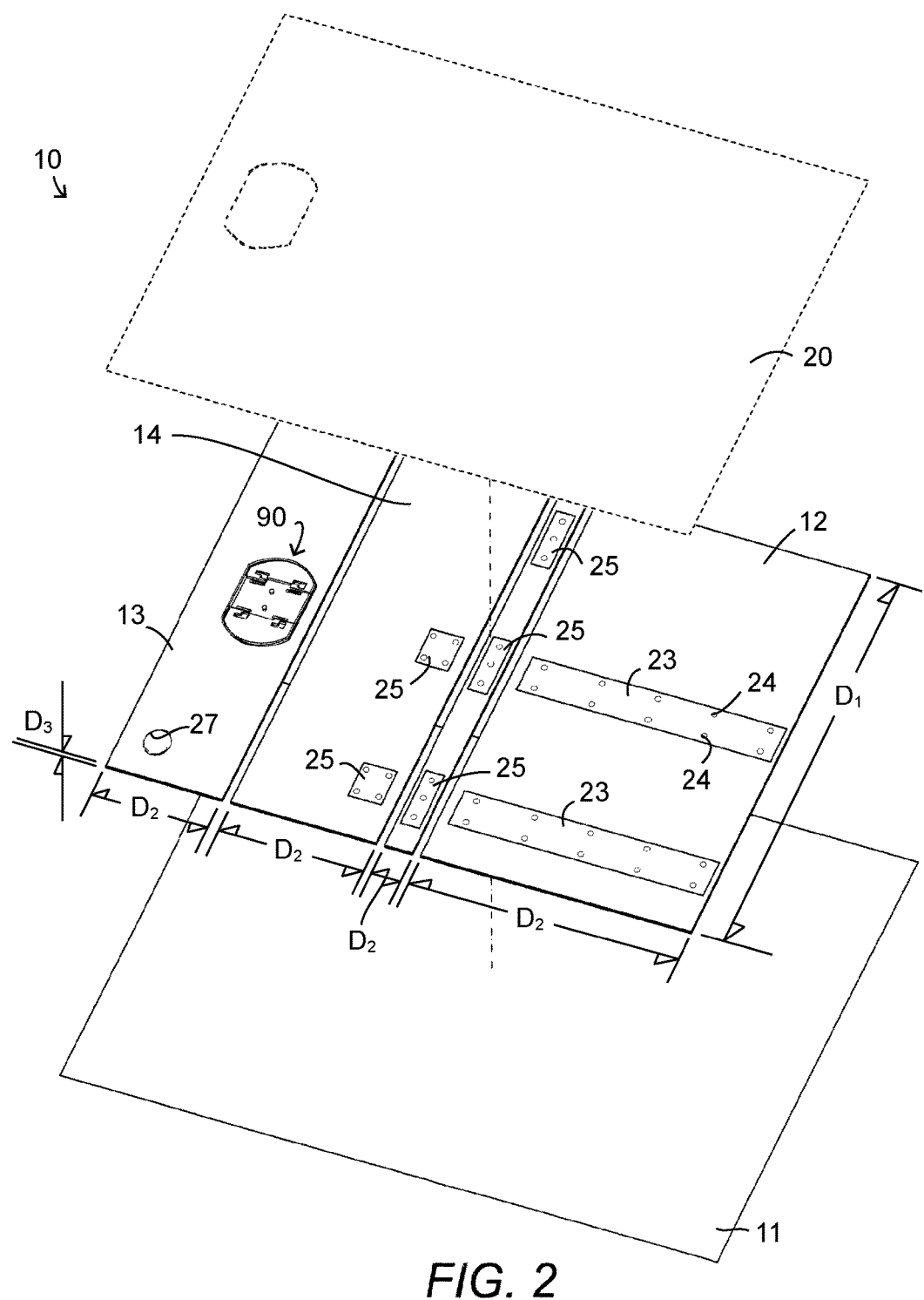
FIG. 2 shows the component parts of the cover.

Referring to FIG. 2, each of the boards 12, 13, 14, 15 has major, length $D_1$ and breadth $D_2$ dimensions and a minor thickness dimension $D_3$ and defines two generally flat, parallel surfaces separated by the thickness dimension. The flexible outer sheet 11 may comprise a single flexible sheet as illustrated or a plurality of flexible sheets, which may include some or all of: a reinforcement strip or strips extending for a small distance on either side of each hinge region to partially cover two adjacent ones of the boards and serving to strengthen the hinge region; a high density plastics sheet or sheets bonded to one or more of the boards to unite them and/or to provide a smooth surface; one or more resiliently compressible sheets or boards, made for example from a foam material, to give a soft feel to the finished case; and a decorative cover sheet or sheets which defines an outer surface 22 of the cover 10 shown in FIG. 3.

The boards are sufficiently stiff that their major surfaces remain flat and parallel in use while they are angularly adjusted about the hinge regions 16 shown in FIG. 1. It will be understood by a person skilled in the art that the flexible sheet or sheets are relatively more flexible than the boards, and the boards are relatively more rigid or inflexible than the flexible sheet or sheets.

The plurality of flexible sheets may be bonded together to form a composite flexible outer sheet 11 before bonding the boards 12, 13, 14, 15 to the composite flexible outer sheet 11 in a conventional pressing apparatus 110, shown in FIG. 4, which may be a press or casemaking machine. Alternatively, respective ones of the flexible sheets may be bonded individually to the boards in several consecutive assembly steps, one or more of which may be carried out in the pressing apparatus 110. In an open or unfolded condition after assembly, the inner and outer surfaces of the cover lie in two flat planes separated by the thickness dimension of the cover which is equal to the thickness dimension $D_3$ of the boards, shown in FIG. 2, plus the outer and inner cover sheets, so that it can be pressed between opposed, parallel flat surfaces 111 of the pressing apparatus 110 as shown in FIG. 4.

The front and rear portions 17, 18 of the cover 10 are foldable relative to one another about the hinge regions 16 to define an open configuration (FIGS. 13-19) and a closed configuration (FIG. 3) in which the front and rear portions 17, 18 are arranged in parallel superposed relation with the receptacle 40 between them as shown.

In this specification, a hinge region is construed as a region comprising a hinge, which is to say, any arrangement that permits relative angular movement between the two parts which it connects together. It can be seen that the hinges defined by the hinge regions 16 also have length, breadth and thickness dimensions, the length dimension of each hinge region 16 being indicated by $D_1$ since it is equal to and extends in parallel with the length dimension $D_1$ of each of the respective boards on either side of the hinge. The thickness dimension of each hinge region may advantageously be somewhat less than the corresponding thickness dimension $D_3$ of the respective boards.

The flexible outer sheet 11 extends over the outer surface 22 of the cover 10 including both of the first and second boards 12, 13 so that simply by selecting an appropriate outer sheet, the overall appearance of the cover can be readily adapted to suit the different tastes of different consumers. Since the flexible outer sheet 11 necessarily extends across the or each hinge region 16, it is preferable to configure the hinge region(s) to allow the outer sheet to move freely with the respective boards rather than constraining it to move about a fixed axis which might cause local creasing in use.

Preferably therefore, as shown, the or each hinge region comprises or consists of the flexible outer sheet 11 or a flexible, preferably laminated assembly of flexible sheets including the flexible outer sheet, with the flexible outer sheet 11 or flexible assembly of flexible sheets extending across the gap between each of the respective pair of relatively rigid boards and being attached to each of the boards on either side of the gap to connect the boards together. Further advantageously, this construction results in a flat assembly which is much easier to press during manufacture in a casemaking machine or the like than would be, for example, a hinge comprising a pivot axis between two rigid parts connected for example by a pin.

Figure 5:
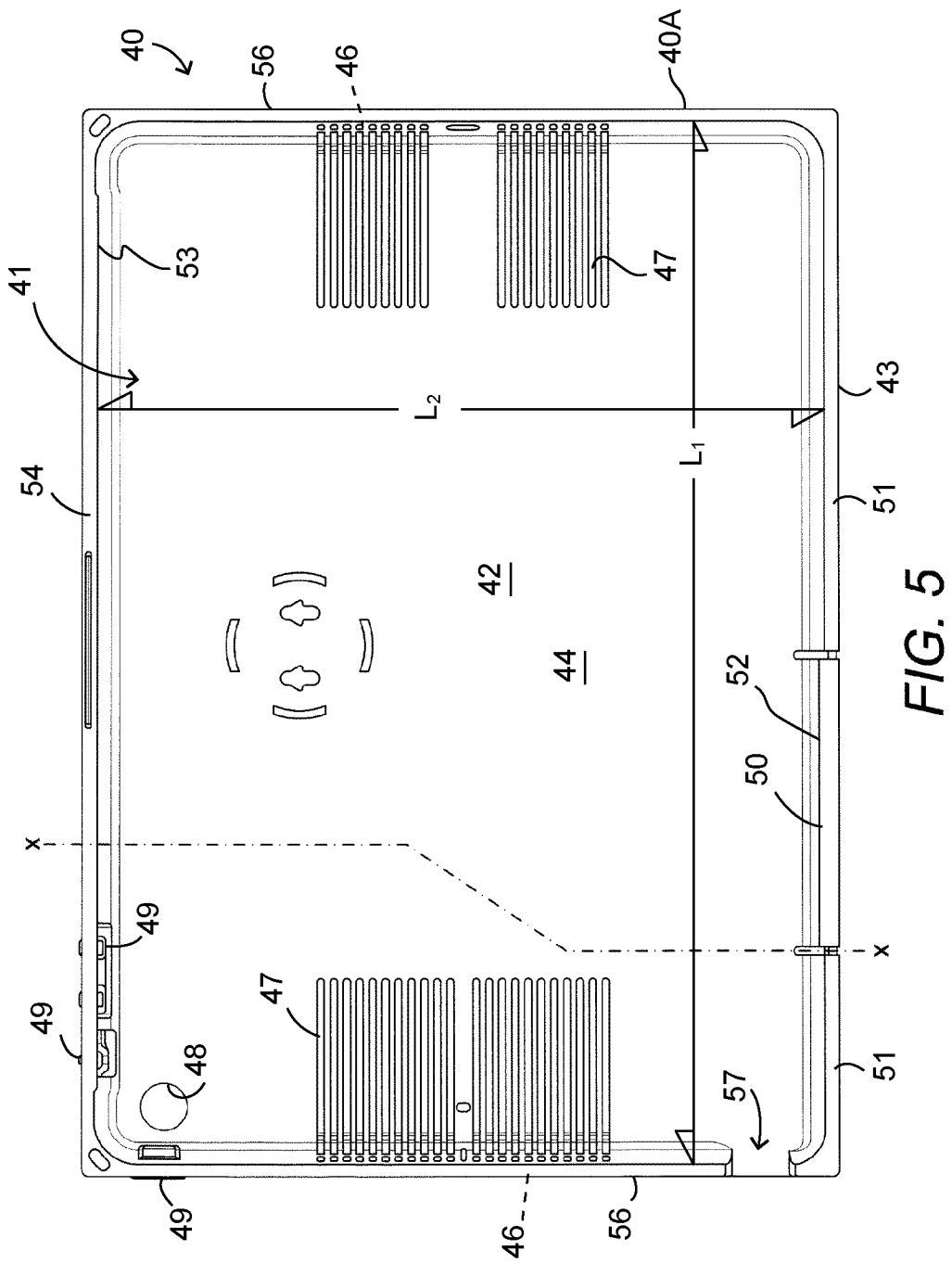
FIG. 5 is a top view of the receptacle.
Figure 14:
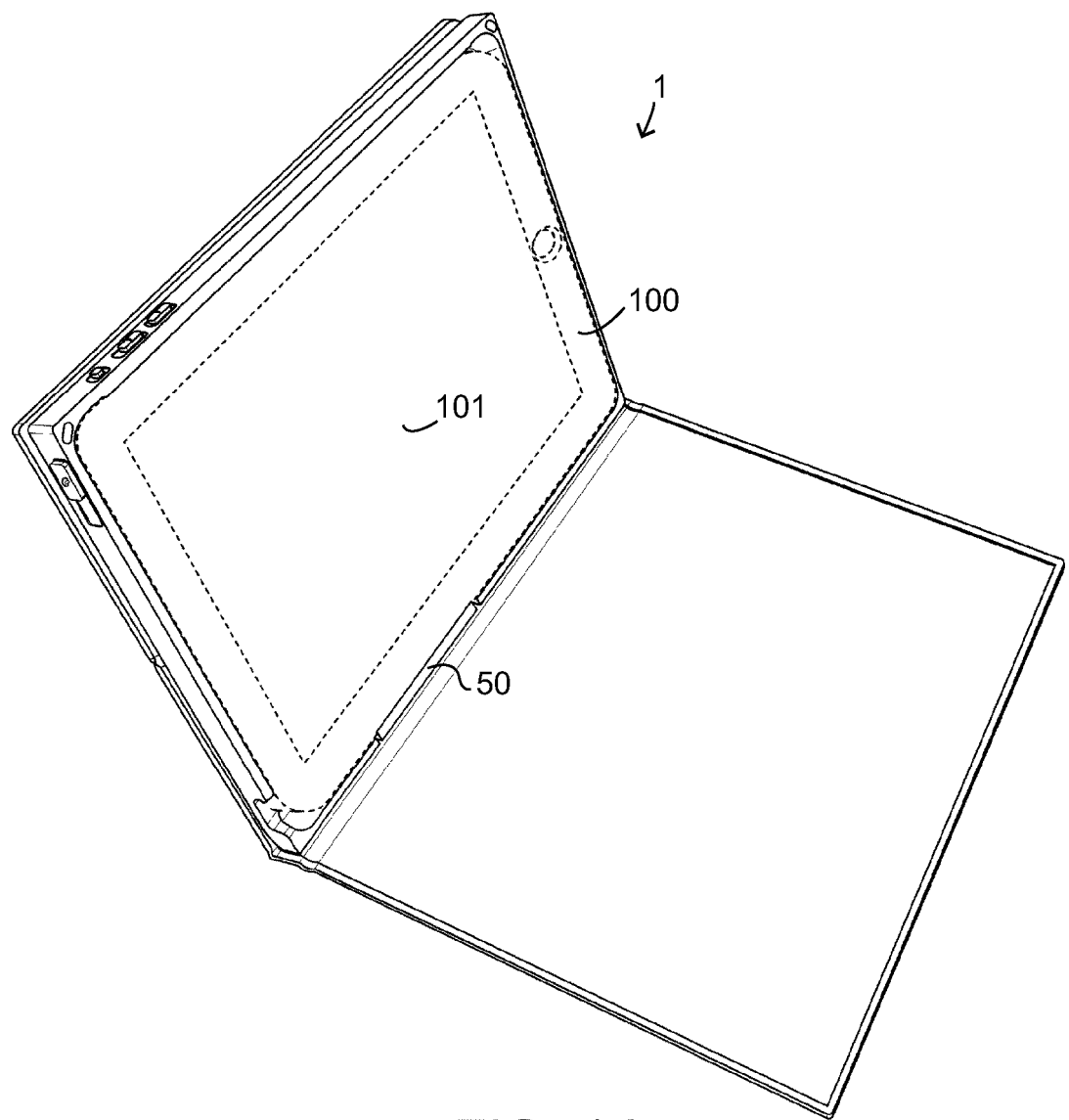
FIG. 14 is a view corresponding to FIG. 13 with the tablet in position in the receptacle.
Figure 15:
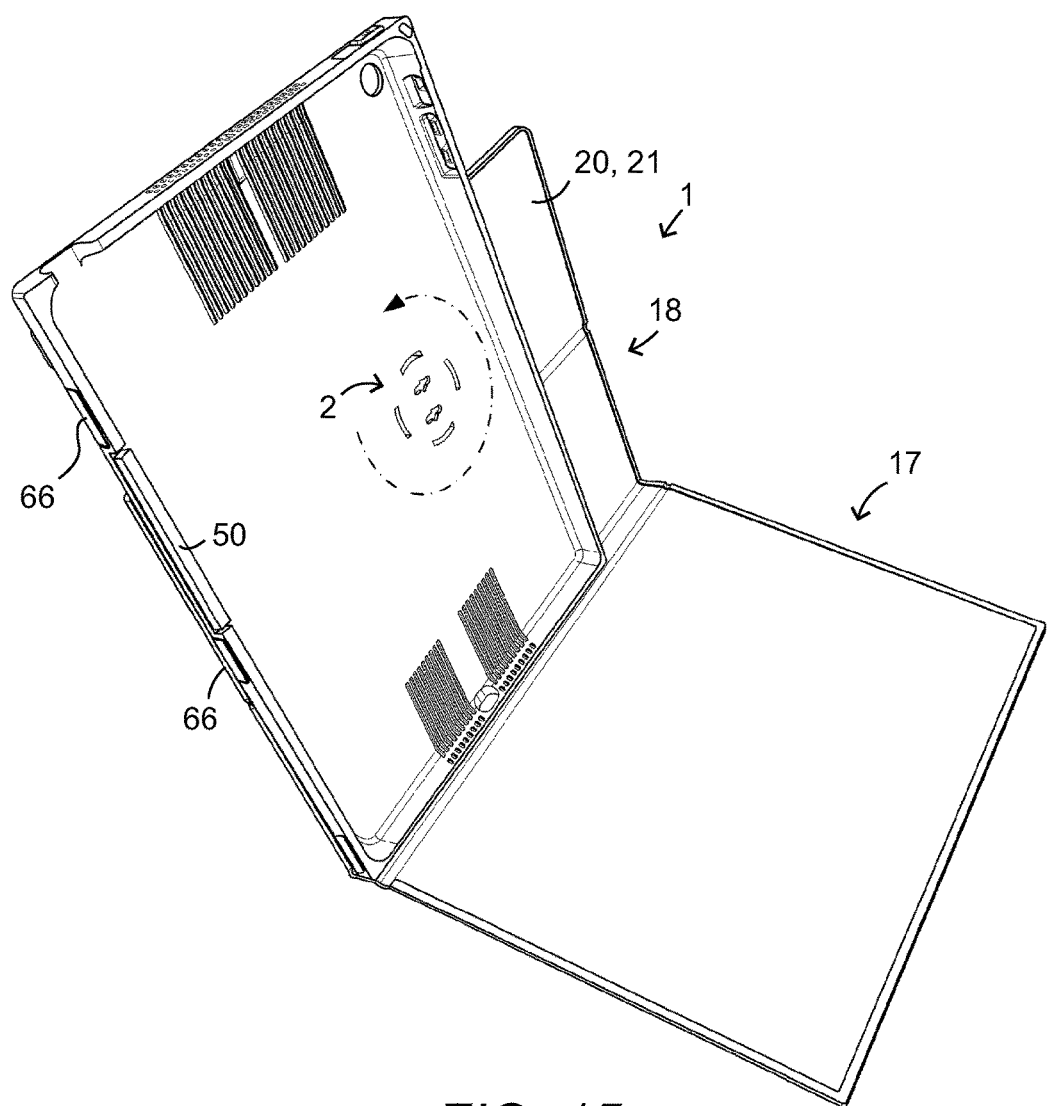
FIG. 15 shows the receptacle rotated to the portrait position.
Figure 16:
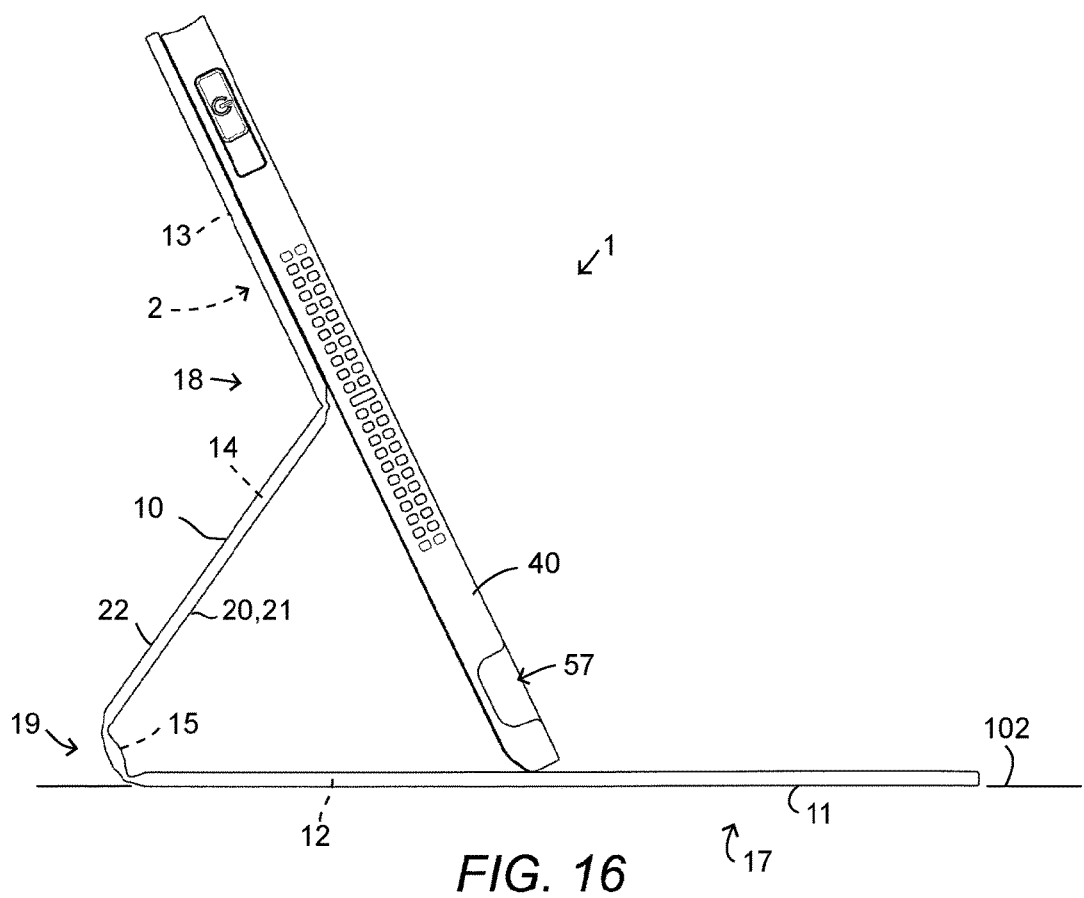
FIGS. 16 and 17 show the case in end view resting on a support surface with the receptacle in the landscape position and adjusted to different viewing angles.
Figure 17:
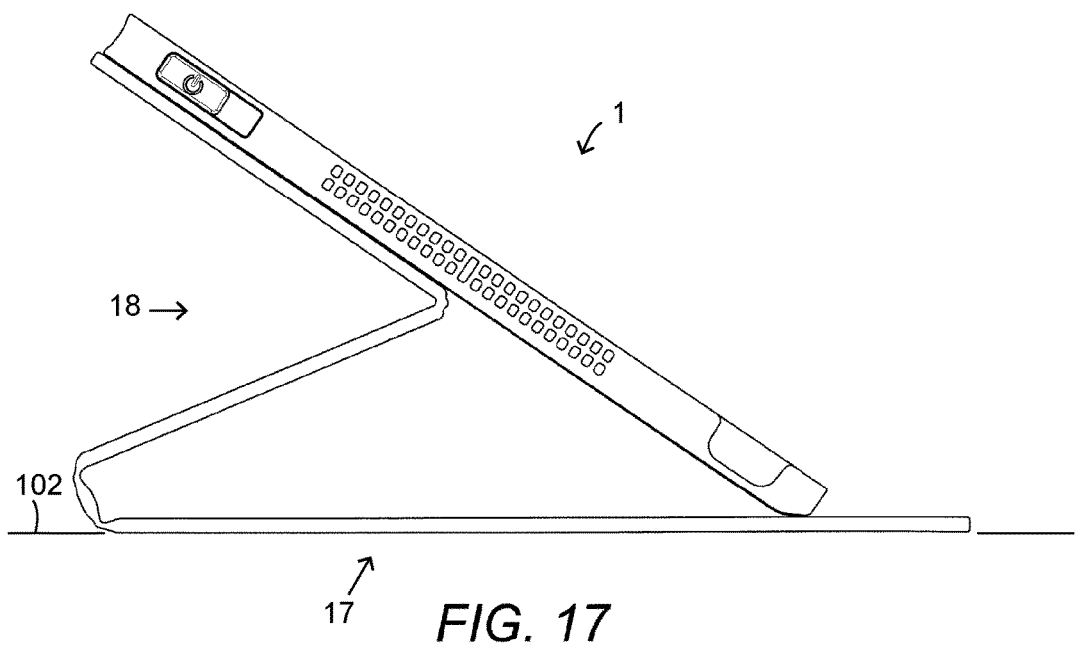
Figure 18:
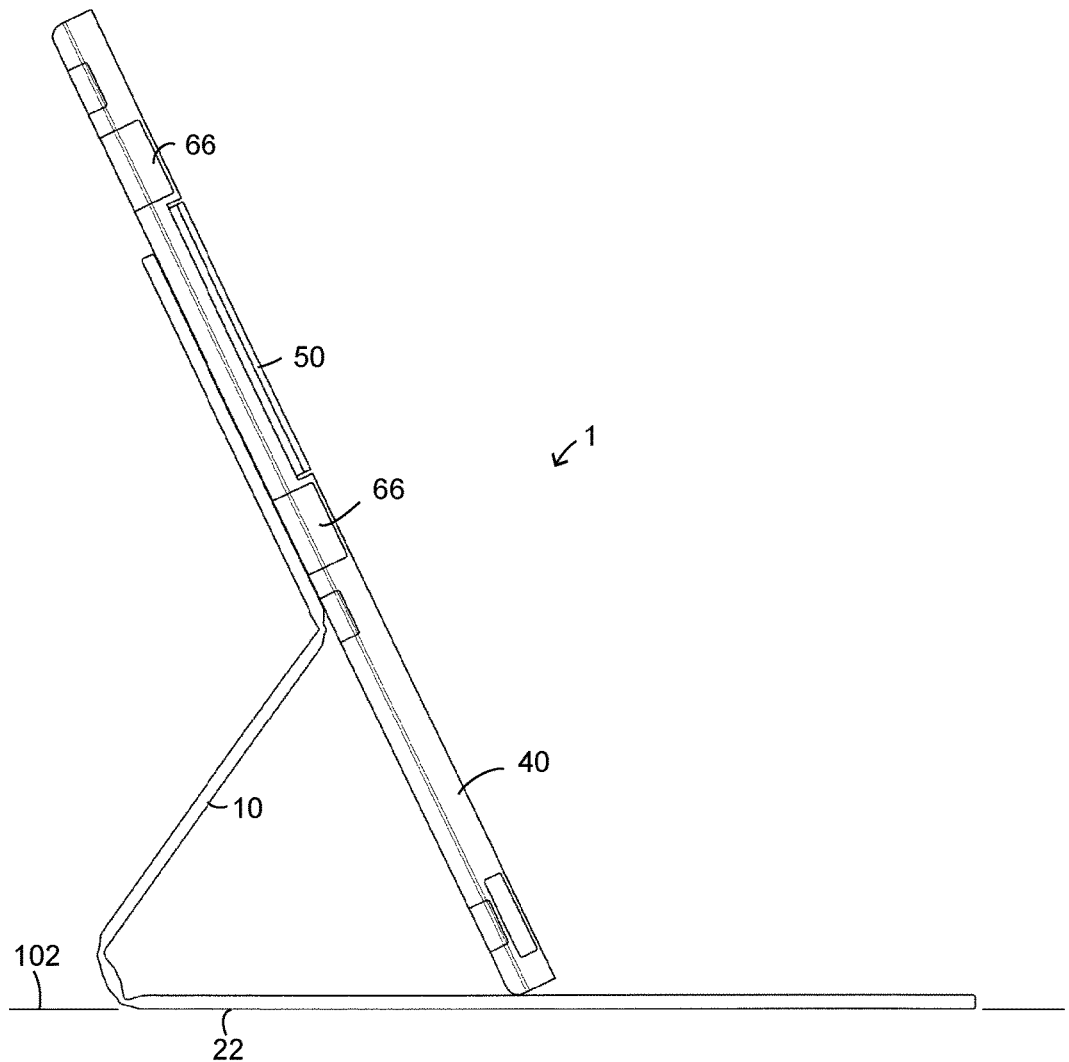
FIGS. 18 and 19 show the case in end view resting on a support surface with the receptacle in the portrait position and adjusted to different viewing angles.
Figure 19:
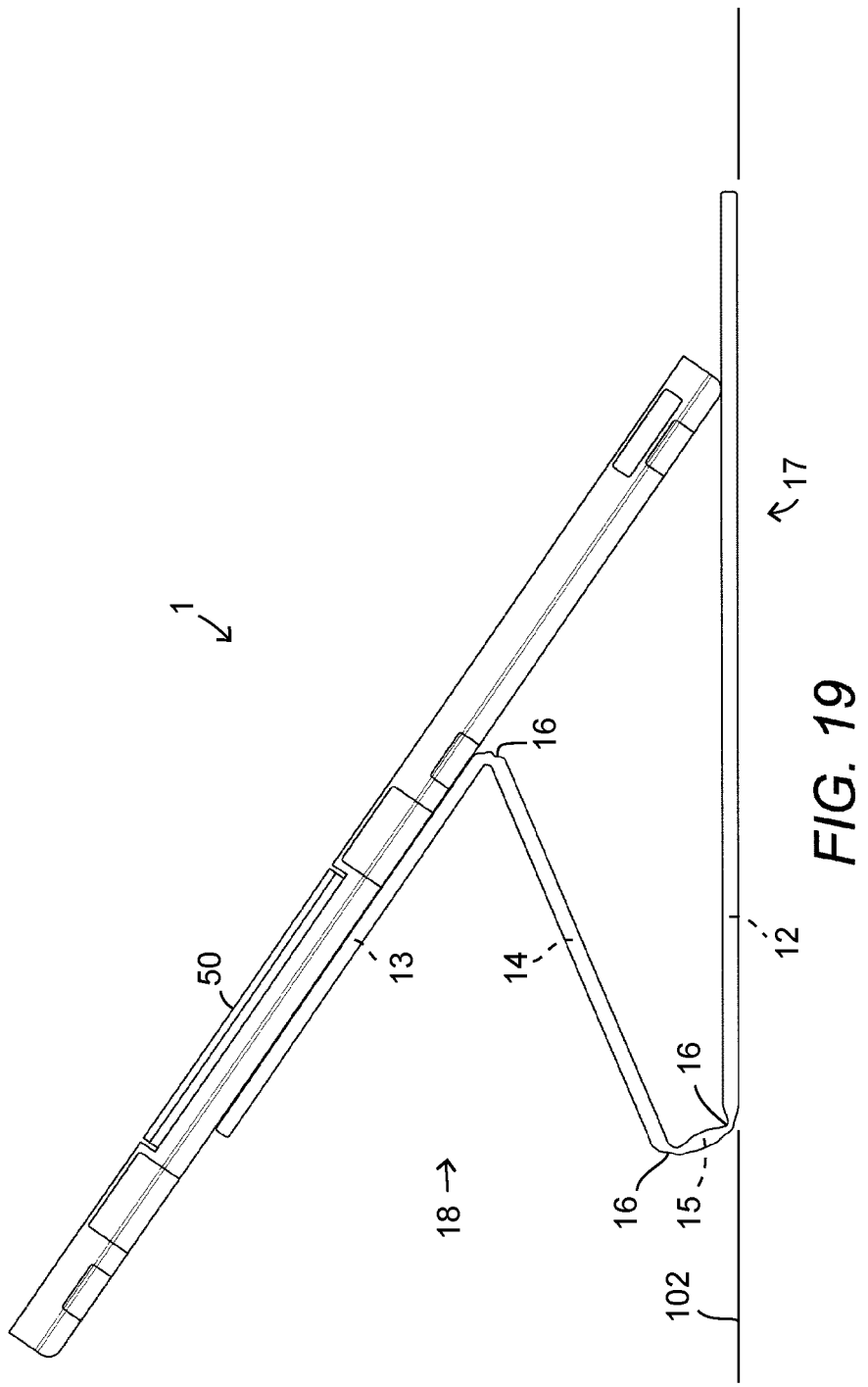

As best shown in FIG. 5, the receptacle 40 in this example is a unitary moulded plastics tray 40A with a rear wall 42 and a peripheral wall 43 extending between the rear wall and a viewing aperture 41 defined within the wall 43, and is configured to releasably retain the tablet 100 so that a screen 101 of the tablet is exposed at the viewing aperture 41 (FIG. 14). In practice, the peripheral wall may be configured to closely grip the tablet around its periphery including at the corners.

Figure 6:
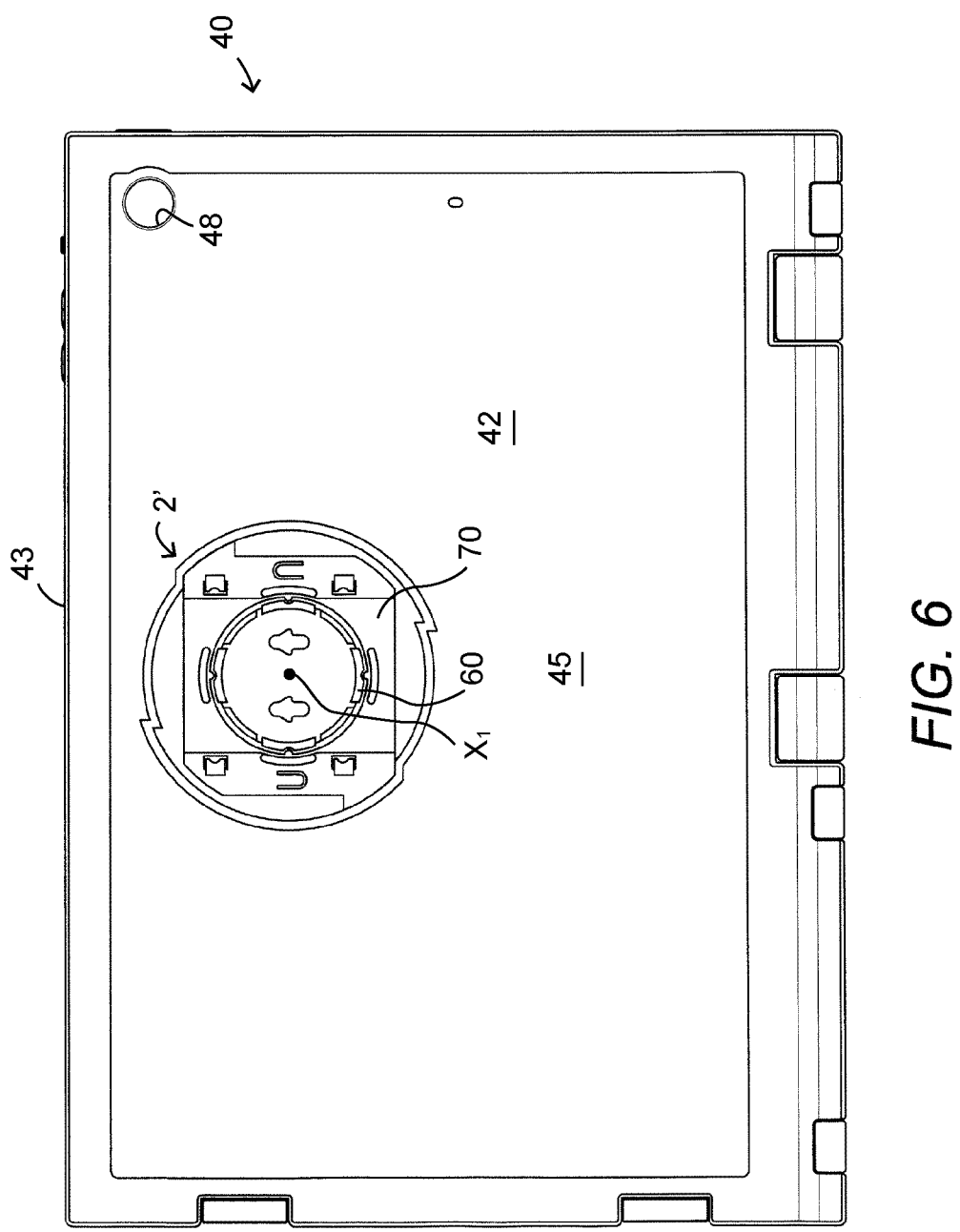
FIG. 6 is a bottom view of the receptacle after fitting the intermediate connector.

Referring to FIGS. 5 and 6, the rear wall 42 of the receptacle 40 has opposite front 44 and rear 45 surfaces which are generally flat and parallel, and extend over at least most, preferably substantially all, of the inner surface 21 of the rear portion 18 of the cover 10 in the closed position (FIG. 3). It can also be seen in FIG. 3 that the receptacle 40 is substantially conterminous with the front and rear portions 17, 18 of the cover 10 when projected onto a plane $P_1$ parallel with the viewing aperture 41, shown in FIG. 5, of the receptacle in the closed position.

It can be seen that the viewing aperture 41 has a maximum length dimension $L_1$ and a maximum breadth dimension $L_2$ (FIG. 5), wherein in the closed configuration (FIG. 3) the length dimension $L_1$ extends in parallel with the length dimension $D_1$ of the first, second and third boards 12, 13, 14, and the breadth dimension $L_2$ extends in parallel with the breadth dimensions $D_2$ of the first, second and third boards 12, 13, 14.

Since each hinge region 16 preferably comprises or consists of a sheet or assembly of sheets of flexible material which is necessarily relatively thin compared with its length and breadth, typically having a thickness less than about 2% or even less than 1% of its length dimension $D_1$, (i.e. its dimension parallel with the adjacent edges of the boards which it connects together), it is desirable to reduce the risk of tearing the sheet material of the hinge by minimising local stresses in the sheet material resulting from torque applied to the hinge in the plane of the flexible sheet or sheets. This torque will be proportionate to the size of the tablet and the receptacle in which it is mounted, since forces applied in use to the tablet or receptacle, e.g. during rotation of the receptacle, will often be reacted via the hinge region 16.

For this reason, preferably the length dimension $D_1$ of each of the first and second boards 12, 13 and the at least one hinge region 16 is at least equal to the length dimension $L_1$ of the viewing aperture 41.

Referring back to FIG. 5, the peripheral wall 43 includes at least one ventilation aperture 46 which is exposed between the front and rear portions 17, 18 of the cover 10 in the closed position (FIG. 3). The front surface 44 of the rear wall includes at least one recess, in the illustrated example comprising a set of grooves 47, which extend in parallel with the viewing aperture 41 and communicate fluidly with the ventilation aperture 46 to carry cooling air to a ventilation opening (not shown) on the back of the tablet. In this example, a camera lens aperture 48 is provided in one corner of the rear wall 42, and moveable buttons 49 are provided in the peripheral wall 43 to engage respective control buttons of the tablet for which the receptacle is designed.

The peripheral wall 43 is divided to define a latch portion 50 between two adjacent portions 51 on one long side of the tray 40A, the latch portion 50 being connected to the adjacent portions 51 by the rear wall 42 and including a lip 52 at its inner free edge. A similar lip 53 is provided on the inner free edge of that portion 54 of the peripheral wall which defines the long side of the tray 40A opposite the latch 50, whereas those portions 51 of the peripheral wall adjacent to the latch and on the same side of the tray as the latch do not have a lip. There is also no lip on opposed peripheral wall portions 56 defining the short sides of the tray 40A.

Figure 8:
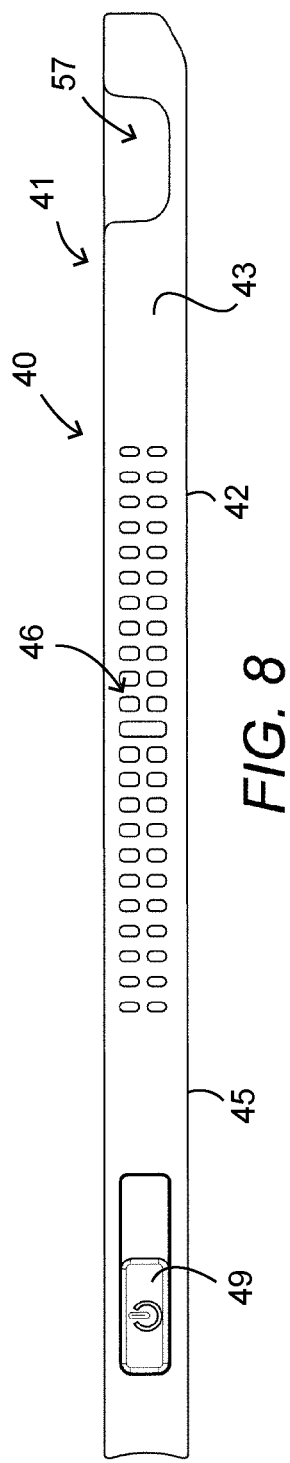
FIG. 8 is an end view of the receptacle before fitting the intermediate connector.
Figure 9:
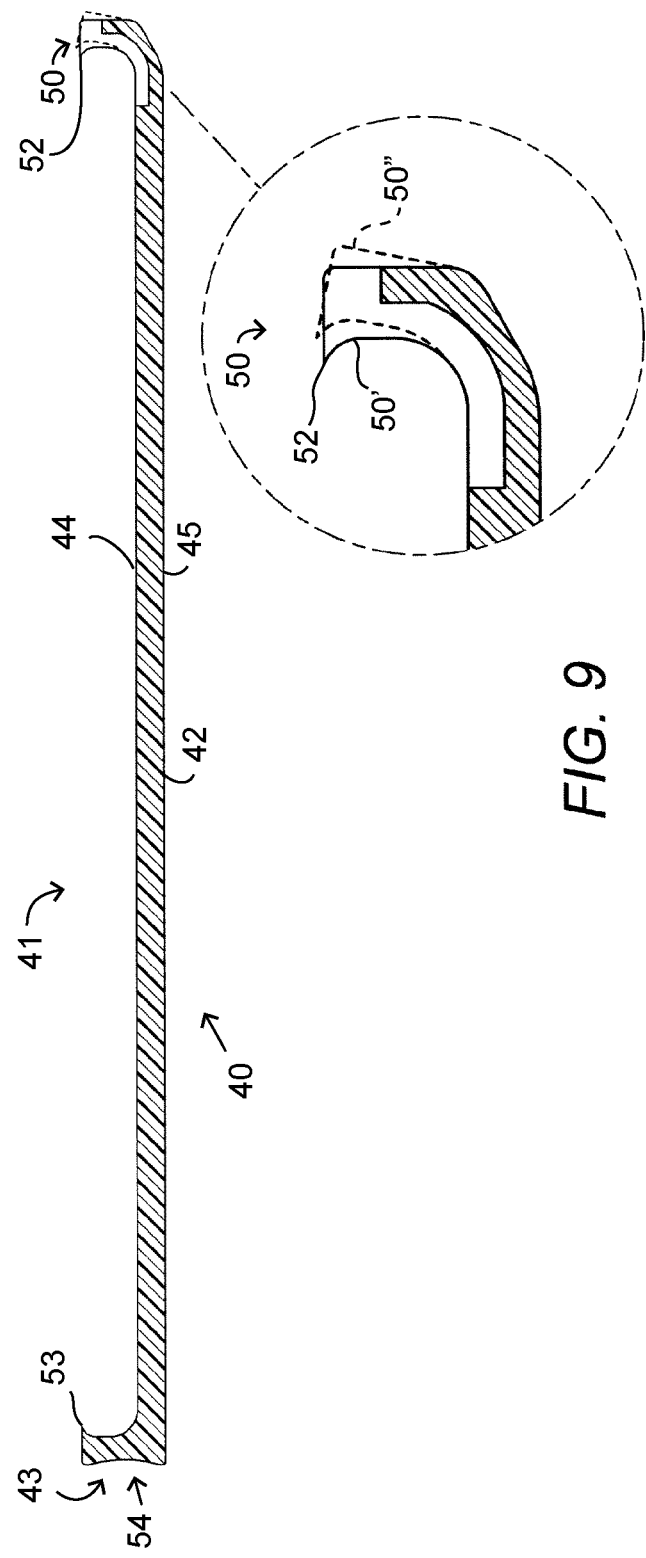
FIG. 9 is a section through the receptacle at line X-X in FIG. 5, showing the latch.

The latch portion 50 is resiliently moveable relative to the adjacent portions 51 between a retaining position (50', FIG. 9) in which the lip 52 extends towards the viewing aperture 41 to retain the device in the receptacle 40, and a release position (50", FIG. 9) in which the lip 52 is retracted outwardly away from the viewing aperture 41 so as to release the device from the receptacle 40. A recess or aperture 57 is provided in the peripheral wall 43 as shown in FIG. 8 so that an edge region of the tablet or other device is exposed at the aperture 57 when the device is retained in the receptacle 40. The aperture 57 is configured to receive a fingertip of the user whereby the user can insert the fingertip beneath the tablet 100 to lift the tablet from the receptacle 40.

The opposed lips of the latch and the opposite portion of the peripheral wall overlap the upper edge of the tablet surrounding the screen 101 to retain the tablet securely in the tray, while the latch 50 and fingertip aperture 57 make it easy to remove the tablet when required by urging the latch 50 to the release position 50" using a thumb or finger of one hand while inserting the finger of the other hand into the aperture 57 to raise the tablet from the receptacle. The aperture 57 is arranged proximate that side of the receptacle which comprises the latch 50, so that the side of the tablet abutting the latch can be raised in a pivotal motion while the other side is retained beneath the lip 53 on the opposite portion of the peripheral wall. The tablet 100 is then lifted out of the receptacle. The tablet can be replaced in the receptacle by laying it in the receptacle so that one long side is beneath the fixed lip 53, and then urging the latch to the release position so that the opposite side of the tablet drops into the receptacle.

Advantageously, the receptacle including the integral latch 50 is made from a relatively hard plastics material with a degree of resilient flexibility, and not from an elastomer or soft, rubbery plastics material. This provides a more secure retention of the tablet than would be possible using an elastomeric or soft plastics material, as well as an easier removal procedure which only requires a single movement to manipulate the latch 50 rather than a general deformation of the entire receptacle 40.

The receptacle 40 is coupled to the rear portion 18 of the cover 10 by an adjustable joint 2 (FIGS. 13, 15), the adjustable joint including an intermediate connector 70 (FIG. 6) and a first coupling element 90 (FIG. 1) which is fixedly contained substantially within the thickness dimension $D_3$ of the second board 13. The intermediate connector 70 is rotatably attached by engaging it in snap-fit relation with the receptacle 40 to define a rotatable joint 2' (FIG. 6) between the intermediate connector 70 and the receptacle 40. The intermediate connector 70 is also releasably attachable to the first coupling element 90 to couple the receptacle 40 to the first coupling element 90. The adjustable joint 2 is thus configured to define a rotation axis $X_1$ about which the receptacle 40 can be rotated when attached to the cover 10 between a portrait orientation (FIGS. 15, 18, 19) and an alternative, landscape orientation (FIGS. 3, 13, 14, 16, 17) relative to the cover, and is also adjustable between a connected configuration (shown in, e.g. FIG. 3, FIG. 13, FIG. 15) in which the receptacle is releasably attached to the cover and a disconnected configuration (shown in FIG. 1) in which the receptacle is detached from the cover.

Figure 11:
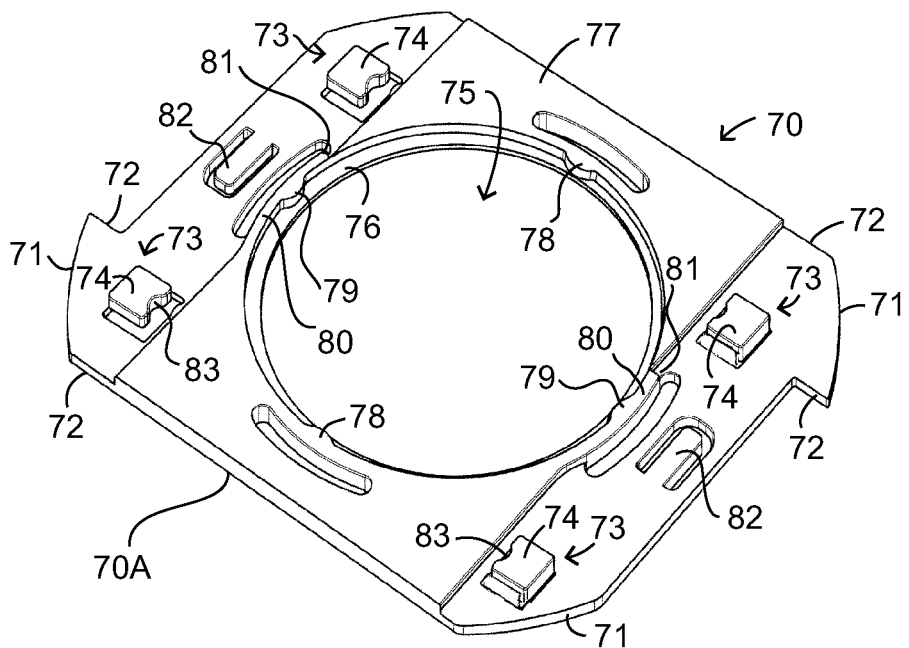
FIG. 11 shows the intermediate connector.

Referring to FIG. 11, the intermediate connector 70 comprises a generally flat plate 70A whose periphery defines radiused portions 71 and abutment surfaces 72. Four projections 73 extend outwardly from the surface of the plate 70A which faces the cover, each projection comprising a flat, square tab 74 which is connected along two of its four sides in spaced parallel relation to the flat plate 70A. A circular aperture 75 with a peripheral, annular flange 76 is formed in a raised, rectangular central portion 77 of the plate 70A, and four cutouts are provided to allow two pairs of detents 78, 79 which project radially inwardly into the aperture 75 to be resiliently deflected outwardly. The two detents 79 are arranged on flexible arms 80 whose distal ends 81 form abutment surfaces projecting beyond the edges of the raised central portion 77. Two further detents (on the reverse surface as shown in FIG. 11, and therefore not visible in this figure) are provided on the distal ends of two flexible portions 82 of the plate 70A.

Figure 7:
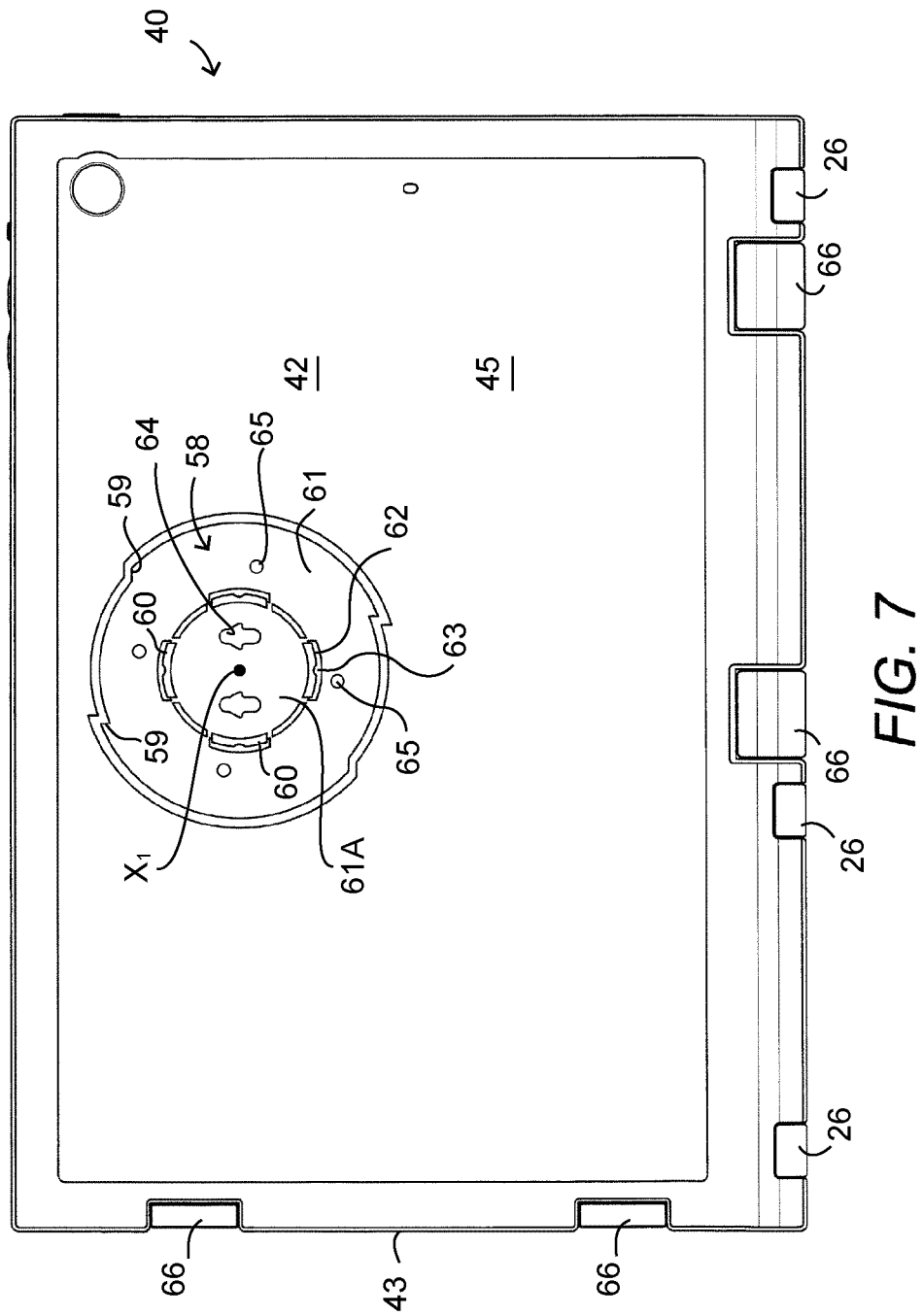
FIG. 7 is a bottom view of the receptacle before fitting the intermediate connector.

Referring to FIG. 7, a recess 58 is formed within the thickness of the rear wall 42 of the receptacle 40, the periphery of the recess being radiused about the rotation axis $X_1$ and defining abutment surfaces 59. Four radiused tabs 60 are arranged around the rotation axis $X_1$ to project axially upwardly into the recess 58 from its base wall 61. A flange 62 with an indent 63 projects radially outwardly from the distal end of each tab 60. Two holes 64 in the form of arrows are formed in a central region 61A of the base wall 61 of the recess 58.

Referring to FIG. 6, the intermediate connector 70 is assembled to the receptacle 40 by inserting it into the recess 58 so that it slidingly abuts the base wall 61 of the recess, with the tabs 60 being snap-fitted into the circular aperture 75 so that the flanges 62 extend over the flange 76 to retain the intermediate connector 70 securely in the recess 58.

Once fitted, the intermediate connector 70 is very difficult to remove, but is able to rotate about the rotation axis $X_1$ through a 90° range of movement which is limited by the cooperating abutment surfaces 72, 59 which in the assembled position of the intermediate connector 70 are substantially contained within the thickness dimension of the rear wall 42 of the receptacle 40.

Figure 12:
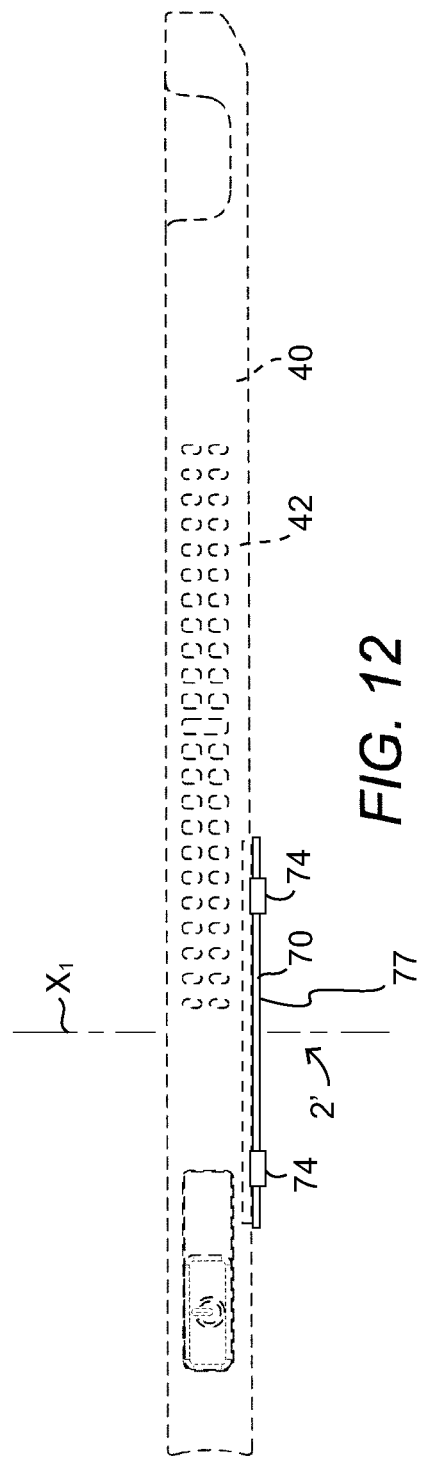
FIG. 12 is an end view of the receptacle after fitting the intermediate connector.
Figure 13:
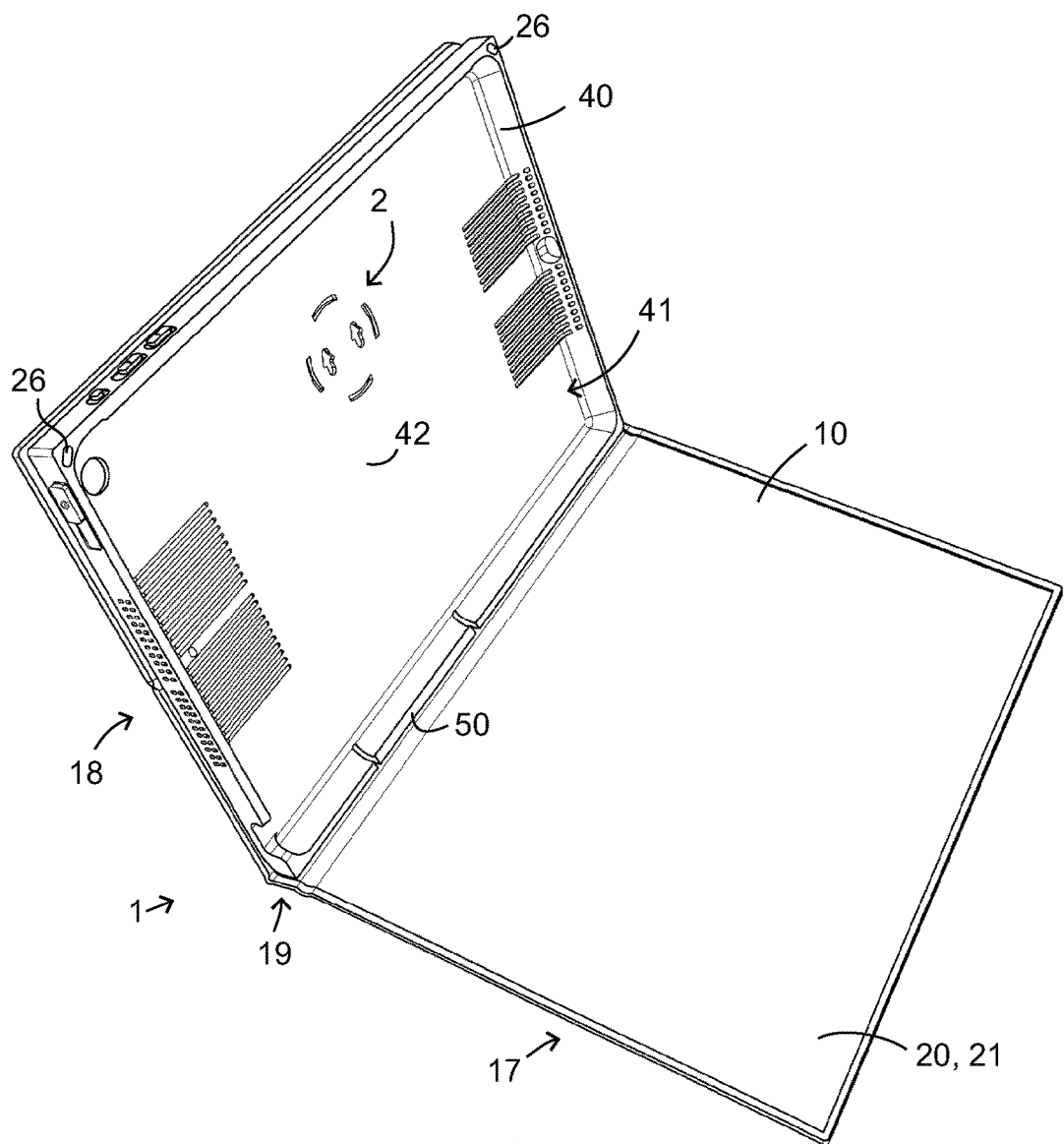
FIG. 13 shows the assembled case with the receptacle in the landscape position.

In the assembled position as shown in FIG. 12, the four tabs 74 and the raised central portion 77 of the flat plate project slightly from the rear surface of the receptacle 40, while the major part of the plate of the intermediate connector 70 is contained in the recess 58 so that the plate is substantially contained within the thickness dimension of the rear wall 42 of the receptacle 40, the thickness dimension being defined between its opposite front and rear surfaces which as shown in FIG. 3 and FIG. 13 are generally flat and parallel and extend over at least most of an inner surface 21 of the rear portion 18 of the cover 10 in the closed position of the case.

When coupled to the cover 10, the intermediate connector 70 is fixed against rotation relative to the first coupling element 90 and the cover 10 so that a threshold torque can be applied to the receptacle 40 relative to the cover 10 to rotate the receptacle about the rotation axis $X_1$ relative to the intermediate connector 70. The tabs 60 and detents 78, 79 are deflected resiliently and radially with respect to the rotation axis $X_1$ to disengage the detents 78, 79 from the indents 63 and the detents on the flexible portions 82 from corresponding indents 65 in the base wall 61 of the recess 58, with the respective detents and indents re-engaging in the final rotated position to provide indexed movement between the two rotated positions. The respective detents and indents of the intermediate connector 70 and the receptacle 40 thus define a detent mechanism which retains the receptacle 40 in each of the portrait and landscape orientations, the detent mechanism being releasable by applying a threshold torque to rotate the receptacle 40 about the rotation axis X1. This makes it easy for the user to rotate the receptacle between portrait and landscape orientations and retains the receptacle in the desired orientation.

The intermediate connector 70 provides a secure rotatable joint 2 which cannot be inadvertently separated, while also providing a secure detachable connection 2" to the first coupling element 90 within the thickness $D_3$ of the second board 13 of the cover 10. By making the rotatable portion 2' of the joint and the detachable portion 2" of the joint as two distinct structural parts of a unitary intermediate connector 70, rather than combining them into a single structural part, it is possible to provide an interaction via the intermediate connector 70 between abutment surfaces on the receptacle 40 and the first coupling element 90, which in the illustrated example as further described below is arranged to prevent the receptacle 40 from being moved in the detachment direction unless it is first rotated to the correct orientation. This makes the adjustable joint 2 more secure by preventing inadvertent detachment when the receptacle 40 is rotated to the portrait orientation, requiring the user to first rotate it back to the landscape orientation before detachment is possible.

Preferably, the first coupling element 90, the intermediate connector 70 and the receptacle 40 are all moulded from plastics material. This provides cost-effective manufacture of relatively intricate parts, and moreover allows the resilient properties of a relatively hard but tough plastics material to provide an elastic detent action which locates and retains the parts in the desired configuration in use. However, the moving plastics parts are subject to wear, particularly those parts of the rotatable portion 2' of the joint 2 which may be operated more frequently than the detachable portion 2".

For this reason too, it is desirable for the rotatable portion 2' of the joint to be structurally distinct from the detachable portion 2" of the joint, so that the one-time snap fit connection of the rotatable portion of the joint can securely retain the parts together, even after protracted use, without compromising the secure connection of the component parts of the detachable portion of the joint.

Figure 10:
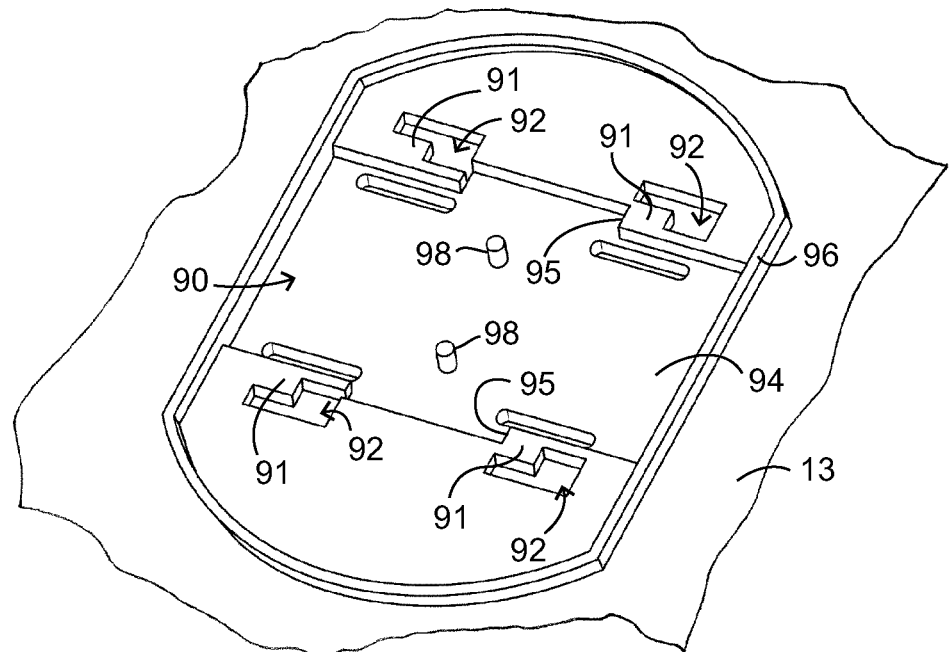
FIG. 10 shows the inwardly facing side of a portion of the second board of the cover including the first coupling element.
Figure 20:
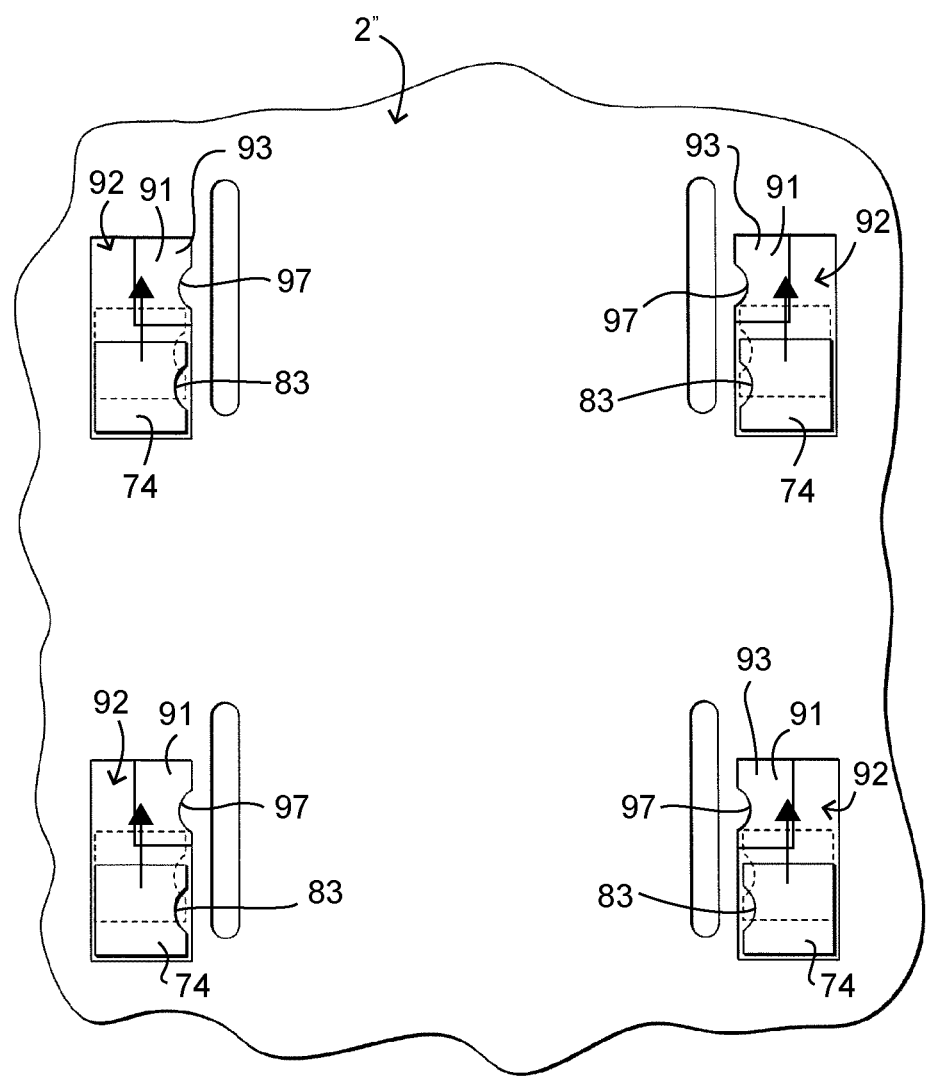
FIGS. 20 and 21 show the outwardly facing side of the portion of the second board comprising the first coupling element, i.e. the opposite side from that shown in FIG. 10, with the outer flexible sheet removed to reveal the projecting tabs of the intermediate connector engaged in the recesses respectively in a decoupled position and a coupled position.

Referring to FIG. 2 and FIG. 10, the first coupling element 90 comprises a central region of the second board 13 which is moulded integrally with the second board to define four thin, flat plates 91 bounded by recesses 92, which may extend through the second board 13 to form apertures as shown. In this example, the recesses 92 are substantially L-shaped but may be other shapes in alternative embodiments. The plates 91 are thinner than the surrounding, major part of the second board 13 so that their outwardly facing surfaces 93, shown in FIG. 20, are in spaced parallel relation to the flexible outer sheet 11. Referring back to FIG. 10, there is a shallow rectangular recess 94 between the plates 91. The recess 94 is widened in its central region to define shoulders 95. In the example shown, the first coupling element 90 is surrounded by a rim 96 which is slightly raised to lie flush with the inner surface 21 of the inner sheet 20, providing a neat edge to the cutout in the inner sheet 20 through which the first coupling element 90 is exposed.

Figure 21:
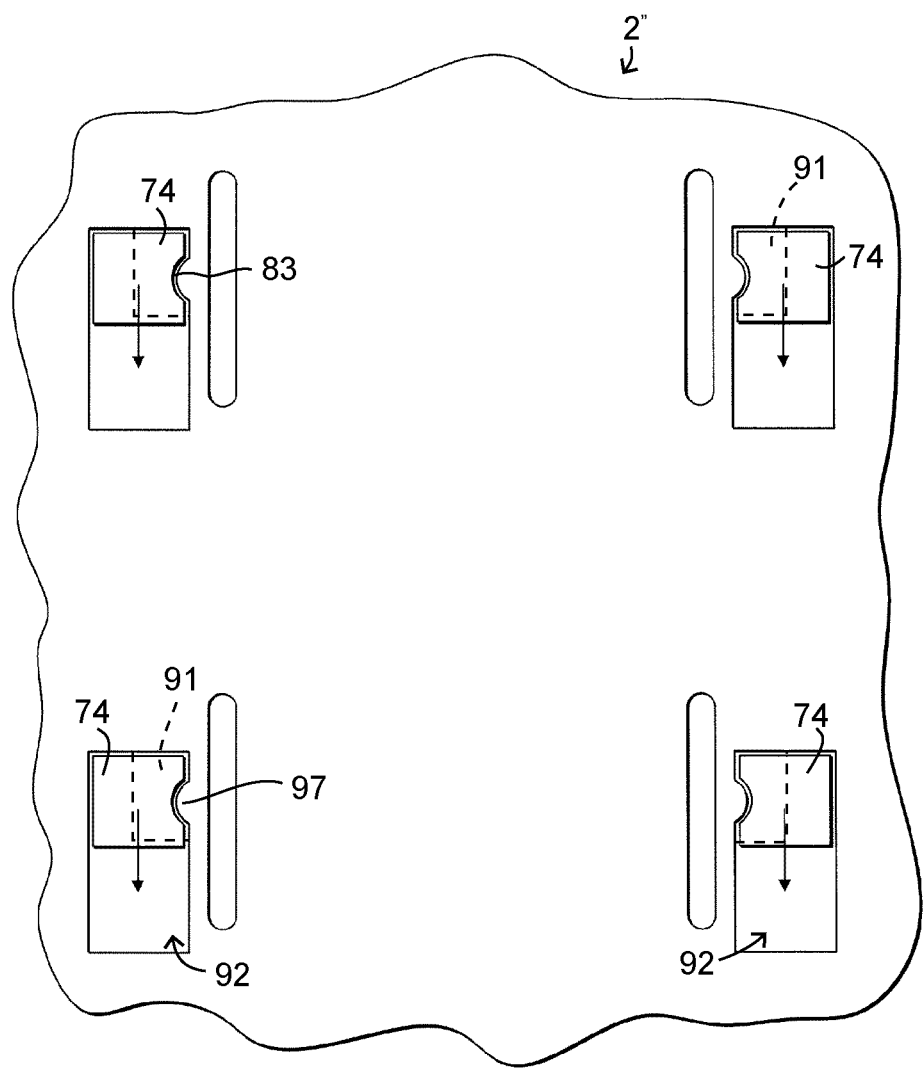

The tabs 74 are received in the recesses 92 by moving the receptacle 40 towards the second board 13, and then slidingly engaged behind the flat plates 91 by sliding the receptacle 40 in parallel with the second board 13 over its inner surface 21 in the direction of the arrows as shown in FIG. 20 to couple the intermediate connector 70 to the first coupling element 90. In the coupled position as shown in FIG. 21 the tabs 74 are retained by detents 97, best shown in FIG. 20, forming part of first coupling element 90. The detents 97 are resiliently deflected as the tabs 74 move between the coupled and decoupled positions to engage in indents 83 in the tabs 74, which are best shown in FIG. 20. The receptacle 40 can be decoupled and removed from the cover 10 by moving it back in the opposite direction as shown by the arrows in FIG. 21 to slide the tabs 74 out of engagement with the flat plates 91.

In the coupled position, the raised, rectangular central portion 77 of the generally flat plate 70A which forms the body of the intermediate connector 70 is received in the shallow rectangular recess 94 which together with the four tabs 74 retains the intermediate connector 70 in rotationally fixed relation to the second board 13 so that the rear surface 45 of the rear wall 42 of the receptacle 40 slidingly abuts the inner surface 21 of the rear portion 18 of the cover 10 as it rotates. There is just sufficient clearance to allow the receptacle 40 to rotate when attached to the cover 10, while ensuring that it is always in contact with the flat inner surface 21 of the cover so that any forces applied to the receptacle are reacted axially by the rotatable joint 2' and never as a bending moment along its rotation axis $X_1$, so that the intermediate connector 70 remains securely attached to the receptacle 40.

The integral structure of the first coupling element 90 provides a strong connection whereby the projections 73 transfer forces applied to the receptacle 40 to the second board 13. This allows the first coupling element 90 to be reduced in size so that it is contained within the small thickness dimension of the second board 13. Since the second board 13 and first board 12 extend in parallel on either side of the elongate hinge region 16 which extends for the full length of the case, the forces applied at the adjustable joint 2 are distributed through the second board 13 over the entire length of the hinge region 16, so that by arranging the hinge region 16 to be at least as long as the viewing aperture 41, local stresses in the thin sheet material of the hinge region 16 are reduced to a minimum when torque is applied in the plane of the sheet material.

In combination, these features provide a simpler but more robust construction than conventional arrangements in which torque concentrations are created by relatively narrow hinged connections between a tablet receptacle and a cover, necessitating the use of more complex and bulky pivoting hinge assemblies which are difficult to manufacture by pressing in a casemaking machine or the like.

Advantageously, the respective projections and recesses may be arranged so that the intermediate connector 70 is slidingly and releasably engaged with the first coupling element 90 in a direction aligned with a respective one of a length dimension and a breadth dimension of the receptacle 40, so that it is releasable from the first coupling element 90 only when the receptacle 40 is in the portrait orientation or the landscape orientation, more preferably when the receptacle 40 is in a respective one of the portrait and landscape orientations but not when the receptacle is in the other respective one of the portrait and landscape orientations.

In the illustrated example, the receptacle 40 has to be rotated to the landscape orientation before it can be detached. This is accomplished by arranging the distal ends 81 of the flexible arms 80 of the intermediate connector 70 to abut the shoulders 95 of the rectangular recess 94 of the first coupling element 90 in the coupled position. When the receptacle 40 is rotated to the portrait orientation, the flanges 62 of the radiused tabs 60 prevent radially inward movement of the flexible arms 80, so that their distal ends 81 abut the shoulders 95 to prevent the raised central portion 77 of the intermediate connector 70 from sliding in the direction of the arrows in FIG. 21 to the decoupled position of FIG. 20. When the receptacle 40 is rotated to the landscape orientation, the flanges 62 of the respective other pair of tabs 60 provide sufficient clearance for the arms 80 to move inwardly to clear the shoulders 95 so that the raised central portion 77 of the intermediate connector 70 can slide to decouple the tabs 74 from the plates 91, whereby the receptacle 40 can be lifted away from the second board 13.

To assist the user in detaching and re-attaching the receptacle 40 to the cover 10, the first coupling element 90 includes two posts 98 with coloured ends which are visible in the landscape orientation of the receptacle through the arrow-shaped apertures 64, which indicate the required direction of movement by reference to the ends of the posts.

The detachable joint 2" allows the user to attach covers 10 with different decorative cover sheets to the same receptacle 40, while the arrangement of the first coupling element 90 within the thickness of the second board 13 makes it easy to manufacture a range of covers with different decorative outer sheets, simply by selecting the desired sheet and pressing the sheet and boards in a conventional pressing apparatus. Since the joint 2 is contained in the thickness of the first board 13 and the rear wall 42 of the receptacle 40, and there are no moving parts which penetrate the outer surface 22 of the cover, the outer surface of the cover 10 is advantageously unbroken so that the joint 2 does not require any aperture in the cover sheet 11. The cover sheet can therefore provide a decorative finish over the entire flat sides of the case 1, which when closed resembles the cover of a book and adds minimal thickness or bulk to the tablet that it encloses. The case is thus versatile and cost effective to manufacture, convenient to carry and adaptable in use. The detachable joint 2" also allows the user to remove the receptacle 40 and connect it to a separate mount (not shown) having a fixture means (e.g. a suction cup or bracket) for supporting the receptacle holding the tablet on, for example, a car dashboard, kitchen worktop or other surface, or to exchange the receptacle with another receptacle so as to adapt the cover 10 to receive a different tablet. The case 1 may therefore form part of a system of multiple interchangeable covers, receptacles, and mounts.

Referring now to FIGS. 2 and 7, the receptacle 40 is magnetically engageable with the cover 10 to retain the receptacle at a selectable viewing angle when the cover 10 is supported on a horizontal support surface 102, shown in FIGS. 16-19, in each of the landscape orientation and the portrait orientation. For this purpose, a pair of ferromagnetic strips 23 is embedded in parallel relation in the inner surface of the front board 12, as shown in FIG. 2, and the receptacle 40 is provided with at least four magnets 66, as shown in FIG. 7, arranged in pairs on respective long and short sides of the receptacle to engage the ferromagnetic strips 23 in each orientation. The strips 23 may be steel, iron or another ferromagnetic material.

Conveniently, each ferromagnetic strip 23 is provided with a series of holes 24, and the plastics material of the respective board extends into the holes to bond the strip to the board. Further ferromagnetic strips 25 and magnets 26 are incorporated into the boards to hold the cover 10 in the closed position, to retain the receptacle 40 to the spine portion 15 so as to make it easier to fold and manipulate the cover, and to interact with magnetic sensors within the tablet so as to control its operation. The strips 25 may be steel, iron or another ferromagnetic material.

The inner sheet 20 may have a microfiber lining to provide an enhanced friction surface 21 which prevents the edge of the receptacle 40 from slipping when it is arranged at an angle to the horizontal support surface 102 and urged into contact with the microfibre lining by magnetic attraction to the ferromagnetic strips 23. Since the receptacle 40 is positively attracted to the inner surface 21 of the cover 10, the case 1 can be arranged in an open configuration on the horizontal support surface 102 (e.g. a tabletop), not only with the front portion 17 flat on the table but also on edge with the front and rear portions 17, 18 in a vertical plane, while retaining the desired angular configuration of the cover with respect to the tablet. This may be useful, for example, to provide shade from the sun when viewing the screen near a window, or to shield the screen from the view of others. The case may be manufactured by first forming the boards, e.g. by injection moulding, plastics extrusion, and/or other known techniques so that the first coupling element 90 is fixed substantially within the thickness dimension of the second board 13, and then bonding the boards to the flexible sheet 11 by pressing the boards and the flexible sheet together between opposed compression surfaces 111 of the pressing apparatus 110, shown in FIG. 4, to form the cover 10. The receptacle 40 and the intermediate connector 70 are manufactured, e.g. by injection moulding, and assembled together before coupling the receptacle 40 to the first coupling element 90 in the finished cover 10 to define an adjustable joint 2 in the assembled configuration of the case 1.

Advantageously, since the first coupling element 90 is fixed substantially within the thickness of the second board 13, the cover assembly can be pressed in a pressing apparatus 110 of conventional construction having two opposed press surfaces 111, such as an automatic or semi-automatic hydraulic or pneumatic press or an automatic or semi-automatic casemaking machine or game board making machine which may also be configured to manipulate and apply adhesive to the respective parts of the cover 10, without damaging the first coupling element 90. In practice, the cover 10 may pass through a number of pressing steps during manufacture, as will now be described by reference to an example product in which the flexible outer sheet 11 is an assembly comprising multiple parts.

First, a decorative cover sheet is selected. It may comprise, for example, a paper or plastics material, conveniently a high quality paper, and is printed on its outer surface with an ornamental design.

Strips of a high strength sheet reinforcement material such as Tyvek® are glued to the reverse side of the decorative cover sheet to strengthen the hinge regions.

Next, the cover sheet is coated on one side with adhesive using a screen printing technique. Three rectangular sheets of ethylene vinyl acetate (EVA) foam board are stuck to the cover sheet between the hinge regions before the assembly is pressed between opposed flat surfaces 111 to bond the foam to the cover sheet to form a cover sheet assembly 11.

The cover sheet assembly 11 is then transferred to a semi-automatic press for debossing, in which a raised die is used to impress a pattern into the thickness of the cover sheet and foam assembly to give depth to the ornamental design on the outer surface 22 of the decorative cover sheet.

The three main boards 12, 13, 14 and the spine board 15 are then coated with adhesive using a screen printing technique before placing the three main boards onto the EVA foam boards and the spine board directly to the cover sheet assembly 11. The assembly is transferred to another press 110 and pressed again between opposed flat surfaces 111, which may also be heated, to bond the boards to the foam and cover sheet.

Advantageously, since the connection structure defined by the first coupling element 90 is contained within the thickness of the second board 13, it is not necessary to provide any recess in the opposed surfaces 111 of the press 110 to receive it. This makes it possible to use a standard automated pressing apparatus for this step, such as normally employed in volume bookbinding production processes, which makes manufacture faster and simpler. The recessed connection structure of the first coupling element 90 also facilitates other, automated volume manufacturing techniques. For example, the components of the assembly may be fed through a high speed automatic casemaking machine, e.g. by a transfer belt or rollers, and pressed between rapidly reciprocating flat press surfaces or between rolling press surfaces, or many such assembled sheets 20 may be stacked and pressed in a single operation.

The edges of the cover sheet 11 are then glued and turned over to cover the edges of the boards and the assembly is pressed again with controlled pressure in a hydraulic pressing semi-automatic machine 110 to flatten the folded edges.

The second board 13 also includes a camera lens aperture 27 which in the closed position of the case (FIG. 3) is aligned with the camera lens aperture 48 in the receptacle 40, and after pressing, a hole is punched in the cover sheet 11 to reveal the aperture 27.

A pre-cut polyethylene terephthalate (PET) sheet is then coated on one side with adhesive and applied to the exposed inner surfaces of the plastics boards. The PET sheet helps to hold the plastics boards and embedded ferromagnetic strips in place and provides a smooth, even surface. Alternatively, three separate PET sheets can be applied in a similar way to cover respective ones of the boards.

An inner lining sheet 20 comprising a rectangular sheet of microfibre fabric with a cutout for the first coupling element 90 is then coated with adhesive and applied over the PET sheet to form the inner lining of the cover 10. The assembled cover 10 is then introduced into a heated hydraulic press 110 which impresses a logo into the microfiber lining 20.

A plastics ring 28 is then snap fitted through the camera lens aperture 27 in the second board before the microfibre lining 20 of the finished cover is cleaned ready for assembly with the receptacle 40.

In summary, a case 1 for an electronic tablet 100 includes a hinged cover 10 comprising a set of boards 12, 13, 14, 15 connected by a flexible cover sheet 11, and a receptacle 40 which is rotatably and detachably connected to the cover 10 by an intermediate connector 70 forming an adjustable joint 2. The intermediate connector 70 is releasably coupled to a fixed coupling element 90 which is contained within the thickness $D_3$ of one of the boards 13 of the cover 10, so that the assembled cover 10 can be manufactured by pressing in a conventional press 110 or casemaker. The receptacle 40 includes a flexible latch 50 and a recess 57 whereby the user can insert a fingertip to lift the tablet 100 from the receptacle.

Although the cover of the novel tablet case is particularly suited to manufacture in an automatic or semiautomatic casemaking machine, it could of course be made by hand using a manually operated casemaking machine or press or even without using a casemaking machine or press.

Of course, the constraints and threshold forces imposed on the operation of the joint 2 by the various detent mechanisms and abutment surfaces as shown could alternatively be implemented by different structure from that shown. In alternative embodiments, the adjustable joint might be made without an intermediate connector 70, in which case the receptacle could be arranged to directly engage the first coupling element, for example, by means of one or more projections, the one or more projections being receivable in one or more corresponding recesses of the first coupling element to couple the receptacle to the rear portion of the cover. However, if such an arrangement were made both rotatable and detachable, the first coupling element combining both functions within the thickness of the second board would necessarily be substantially more complex and commensurately less robust, and the security of the detachable joint would necessarily depend on the degree of wear of the rotatable joint.

In alternative embodiments, the intermediate connector could be coupled to the first coupling element by a single projection engaging in a single recess in the first coupling element. Alternative coupling configurations are also possible. For example, the first coupling element could have projections which engage in recesses in the intermediate connector. Although the detachable and rotatable functions of the joint are preferably provided in combination, in less preferred embodiments the receptacle could be releasably attachable but not rotatable, or rotatable and attachable without being releasable, for example, by configuring the second board to incorporate the features of the intermediate connector which cooperate with the receptacle to provide a rotatable joint. In further, less preferred embodiments, the receptacle could be attachable to the cover in alternative, portrait and landscape orientations without being rotatable when so attached.

In less preferred embodiments, the rear portion could include only one board or more than two boards, and/or the front board could include two or more boards instead of one. The spine board could be omitted, in which case the spine may comprise a single, flexible hinge region instead of two parallel hinge regions. The boards could also be formed as a unitary moulding or even a unitary plastics extrusion with thin, flexible regions or living hinges that connect the boards together. The inner lining sheet could be omitted, with the inner surfaces of the boards being suitably finished to provide the desired surface characteristics. In yet further, less preferred embodiments, the or each hinge region could comprise a pivot axis between two rigid parts connected, for example, by a pin.

In yet further alternative embodiments, the boards could be made from, for example, a compressed particulate material or any other sufficiently strong and rigid material rather than from moulded or extruded plastics material. In simpler embodiments, a single magnet could be arranged to engage a single ferromagnetic strip.

In a yet further embodiment, a protective case 1 for a portable electronic device 100 comprises a cover 10 and a receptacle 40, the receptacle defining a viewing aperture 41 and configured to releasably retain the device 100 so that a screen 101 of the device is exposed at the viewing aperture. The cover 10 is foldable in use to cover the viewing aperture. The receptacle 40 comprises a tray 40A with a rear wall 42 and a peripheral wall 43 extending between the rear wall and the viewing aperture, wherein the peripheral wall 43 is divided to define a latch portion 50 and two adjacent portions 51, the latch portion being connected to the adjacent portions 51 by the rear wall 42 and including a lip 52. The latch portion 50 is resiliently moveable relative to the adjacent portions 51 of the peripheral wall 43 between a retaining position 50' in which the lip extends towards the viewing aperture to retain the device in the receptacle and a release position 50" in which the lip is retracted outwardly away from the viewing aperture so as to release the device from the receptacle. An aperture 57 is provided in the peripheral wall 43 such that an edge region of the device 100 is exposed at the aperture when the device is retained in the receptacle, the aperture 57 being configured to receive a fingertip of the user to lift the device from the receptacle.

Preferably in such an alternative embodiment, the cover 10 includes a plurality of boards held together by a flexible outer sheet 11, wherein a second board 13 includes first coupling element 90 fixed substantially within its thickness dimension $D_3$, as described above. However, if preferred, the receptacle 40 incorporating a resilient latch portion 50 and fingertip aperture 57 can also be used with other types of folding cover to make it easier for the user to remove a tablet from the receptacle.

It will be understood by a person skilled in the art that many of the details provided above are by way of example only, and are not intended to limit the scope of the invention which is to be determined with reference to the following claims.

What is claimed is:

1. A protective case for a portable electronic device, the case comprising:
   a receptacle defining a viewing aperture and configured to releasably retain the device so that a screen of the device is exposed at the viewing aperture; and
   a cover including:
     a plurality of boards, each board having major, length and breadth dimensions and a minor thickness dimension, and defining two generally flat, parallel surfaces separated by the thickness dimension;
     a front portion and a rear portion, the front portion including at least a first said board and the rear portion including at least a second said board, the front and rear portions being connected together by at least one hinge region and foldable about the hinge region to define an open configuration and a closed configuration, wherein in the closed configuration the front and rear portions are arranged in parallel superposed relation and the receptacle is received between the front and rear portions; and a flexible outer sheet bonded to each of the first and second boards;

wherein the receptacle is coupled to the rear portion of the cover by an adjustable joint, the adjustable joint including a first coupling element, the first coupling element being fixedly contained substantially within the thickness dimension of the second board.

2. The protective case as claimed in claim 1, wherein:
the first coupling element is an integral part of the second board and includes at least one recess;
the adjustable joint includes at least one projection which is receivable in the recess to couple the receptacle to the rear portion of the cover; and
the viewing aperture has a length dimension which extends in parallel with a length dimension of the at least one hinge region and with the length dimension of each of the first and second boards in the closed configuration, the length dimension of each of the first and second boards and the at least one hinge region being at least equal to the length dimension of the viewing aperture.

3. The protective case as claimed in claim 1, wherein the adjustable joint includes an intermediate connector, the intermediate connector being releasably attachable to the first coupling element and being rotatably attached to the receptacle to define a rotation axis, the receptacle being rotatable about the rotation axis when attached to the cover to define a portrait orientation and a landscape orientation with respect to the cover.

4. The protective case as claimed in claim 3, wherein the intermediate connector is releasable from the first coupling element only when the receptacle is in the portrait orientation or the landscape orientation.

5. The protective case as claimed in claim 3, wherein the intermediate connector is releasable from the first coupling element when the receptacle is in a respective one of the portrait and landscape orientations but not when the receptacle is in the other respective one of the portrait and landscape orientations.

6. The protective case as claimed in claim 3, wherein the first coupling element includes at least one recess and the intermediate connector includes at least one projection which is receivable in the recess to couple the intermediate connector to the first coupling element.

7. The protective case as claimed in claim 6, wherein the intermediate connector includes a plate which is substantially contained within a thickness dimension of a rear wall of the receptacle, the thickness dimension being defined between opposite front and rear surfaces of the rear wall of the receptacle, and wherein the projection extends outwardly from the plate.

8. The protective case as claimed in claim 7, wherein the plate and the receptacle define cooperating abutment surfaces which limit the rotation of the plate relative to the receptacle, and the abutment surfaces are substantially contained within the thickness dimension of the rear wall of the receptacle.

9. The protective case as claimed in claim 7, wherein the plate and the receptacle define a detent mechanism which retains the receptacle in each of the portrait and landscape orientations, the detent mechanism being releasable by applying a threshold torque to rotate the receptacle about the rotation axis.

10. The protective case as claimed in claim 1, wherein:
the receptacle includes a tray with a rear wall and a peripheral wall extending between the rear wall and the viewing aperture, the peripheral wall being divided to define a latch portion and two adjacent portions, the latch portion being connected to the adjacent portions by the rear wall and including a lip;
the latch portion is resiliently moveable relative to the adjacent portions between a retaining position in which the lip extends towards the viewing aperture to retain the device in the receptacle and a release position in which the lip is retracted outwardly away from the viewing aperture so as to release the device from the receptacle; and
an aperture is provided in the peripheral wall such that an edge region of the device is exposed at the aperture when the device is retained in the receptacle, the aperture being configured to receive a fingertip of a user to lift the device from the receptacle.

11. The protective case as claimed in claim 1, wherein the receptacle includes a tray with a rear wall and a peripheral wall extending between the rear wall and the viewing aperture, the peripheral wall including at least one ventilation aperture and the rear wall including at least one recess extending in parallel with the viewing aperture and communicating with the ventilation aperture.

12. The protective case as claimed in claim 1, wherein at least one ferromagnetic strip is embedded in the front board of the cover, and the receptacle is provided with at least one magnet to engage the ferromagnetic strip in the cover.

13. The protective case as claimed in claim 12, wherein the front board is made from a plastics material and the ferromagnetic strip is provided with a series of holes, the plastics material of the front board extending into the holes to bond the ferromagnetic strip to the front board.

14. The protective case as claimed in claim 3, wherein a pair of ferromagnetic strips are embedded in parallel relation in the front board of the cover, and the receptacle is provided with at least four magnets arranged in pairs on respective long and short sides of the receptacle to engage the ferromagnetic strips in the cover in each of the landscape and portrait orientations.

15. A method of manufacturing a protective case for a portable electronic device, the method comprising:
providing a receptacle, the receptacle defining a viewing aperture and configured to releasably retain the device so that a screen of the device is exposed at the viewing aperture;
providing a plurality of boards, each board having major, length and breadth dimensions and a minor thickness dimension, and defining two generally flat, parallel surfaces separated by the thickness dimension;
providing a flexible sheet;
bonding the boards to the flexible sheet to define a cover, the cover including a front portion and a rear portion, the front portion including at least a first said board and the rear portion including at least a second said board, the front and rear portions being connected together by at least one hinge region and foldable about the hinge region to define an open configuration and a closed configuration, wherein in an assembled configuration of the receptacle and the cover, the front and rear portions are arranged in parallel superposed relation and the receptacle is received between the front and rear portions in the closed configuration;

fixing a first coupling element substantially within the thickness dimension of the second board;

bonding the boards to the flexible sheet by pressing the boards and the flexible sheet together between opposed compression surfaces of a pressing apparatus; and coupling the receptacle to the first coupling element in the assembled configuration to define an adjustable joint.

16. The method as claimed in claim 15, wherein the receptacle is coupled to the first coupling element by an intermediate connector, and the intermediate connector is engaged in snap-fit relation with the receptacle to define a rotatable joint between the intermediate connector and the receptacle.

17. The method as claimed in claim 16, wherein the intermediate connector is slidingly and releasably engaged with the first coupling element in a direction aligned with a respective one of a length dimension and a breadth dimension of the receptacle.

18. A protective case for a portable electronic device, the case being manufactured by a method comprising:

providing a receptacle, the receptacle defining a viewing aperture and configured to releasably retain the device so that a screen of the device is exposed at the viewing aperture;

providing a plurality of boards, each board having major, length and breadth dimensions and a minor thickness dimension, and defining two generally flat, parallel surfaces separated by the thickness dimension;

providing a flexible sheet;

bonding the boards to the flexible sheet to define a cover, the cover including a front portion and a rear portion, the front portion including at least a first said board and the rear portion including at least a second said board, the front and rear portions being connected together by at least one hinge region and foldable about the hinge region to define an open configuration and a closed configuration, wherein in an assembled configuration of the receptacle and the cover, the front and rear portions are arranged in parallel superposed relation and the receptacle is received between the front and rear portions in the closed configuration;

fixing a first coupling element substantially within the thickness dimension of the second board;

bonding the boards to the flexible sheet by pressing the boards and the flexible sheet together between opposed compression surfaces of a pressing apparatus; and coupling the receptacle to the first coupling element in the assembled configuration to define an adjustable joint.

\* \* \* \* \*